(12) United States Patent
Su et al.

(10) Patent No.: US 11,787,540 B2
(45) Date of Patent: Oct. 17, 2023

(54) UNMANNED FLIGHT SYSTEMS AND CONTROL SYSTEMS THEREOF

(71) Applicant: HANGZHOU ZERO ZERO TECHNOLOGY CO., LTD., HangZhou (CN)

(72) Inventors: Xian Su, HangZhou (CN); Chenhui Qian, HangZhou (CN); Tong Zhang, HangZhou (CN)

(73) Assignee: HANGZHOU ZERO ZERO TECHNOLOGY CO., LTD., Zhejiang (CN)

( * ) Notice: Subject to any disclaimer, the term of this patent is extended or adjusted under 35 U.S.C. 154(b) by 378 days.

(21) Appl. No.: 16/759,155

(22) PCT Filed: Nov. 27, 2019

(86) PCT No.: PCT/CN2019/121276
§ 371 (c)(1),
(2) Date: Apr. 24, 2020

(87) PCT Pub. No.: WO2020/151361
PCT Pub. Date: Jul. 30, 2020

(65) Prior Publication Data
US 2021/0221501 A1 Jul. 22, 2021

Related U.S. Application Data

(60) Provisional application No. 62/795,942, filed on Jan. 23, 2019.

(30) Foreign Application Priority Data

Nov. 5, 2019 (CN) .......................... 201911070318.6

(51) Int. Cl.
*B64C 39/02* (2023.01)
*B64D 47/08* (2006.01)
(Continued)

(52) U.S. Cl.
CPC ............ *B64C 39/024* (2013.01); *B64D 47/08* (2013.01); *B64C 27/08* (2013.01); *B64C 27/50* (2013.01);
(Continued)

(58) Field of Classification Search
CPC ...................................................... B64C 3/56
See application file for complete search history.

(56) References Cited

U.S. PATENT DOCUMENTS

| 6,238,124 | B1 * | 5/2001 | Merlo | ..................... A61F 2/68 |
| | | | | 403/103 |
| 2016/0159472 | A1 * | 6/2016 | Chan | ..................... B64C 27/54 |
| | | | | 244/39 |

(Continued)

*Primary Examiner* — Jelani A Smith
*Assistant Examiner* — Davin Seol
(74) *Attorney, Agent, or Firm* — PV IP PC; Wei Te Chung; Zhigang Ma

(57) ABSTRACT

The present disclosure provides an unmanned flight system and a control system for an unmanned flight system. The unmanned flight system comprises: a body and a lift mechanism connected to the body, wherein the lift mechanism includes two rotor assembly arm structures respectively provided on two sides of the body, wherein each of the rotor assembly arm structures respectively includes: an arm, a pivotable rotor assembly, a motor for driving the rotor assembly to pivot about a pivot axis, and a motor base for mounting the motor, wherein one end of the arm is pivotally connected to one side of the body, the motor base is pivotally provided on the other end of the arm, and a rotational axis of the motor base is higher than a center of gravity of the unmanned flight system. The unmanned flight system according to the present disclosure can achieve a longer flight time, a simple rotor assembly structure, and easier overall assembly and maintenance.

19 Claims, 26 Drawing Sheets

(51) Int. Cl.
*B64C 27/08* (2023.01)
*B64C 27/50* (2006.01)
*G05D 1/10* (2006.01)
*B64U 30/20* (2023.01)
*B64U 101/30* (2023.01)

(52) U.S. Cl.
CPC .......... *B64U 30/20* (2023.01); *B64U 2101/30* (2023.01); *B64U 2201/20* (2023.01); *G05D 1/101* (2013.01)

(56) References Cited

U.S. PATENT DOCUMENTS

| | | | |
|---|---|---|---|
| 2017/0043870 A1* | 2/2017 | Wu | B64D 47/08 |
| 2017/0247098 A1* | 8/2017 | Sanlaville | B64C 39/024 |
| 2017/0247107 A1* | 8/2017 | Hauer | B64D 35/06 |
| 2018/0257769 A1* | 9/2018 | Goldstein | B64C 27/50 |
| 2018/0327092 A1* | 11/2018 | Deng | B64C 39/024 |
| 2019/0084673 A1* | 3/2019 | Chen | B64C 39/024 |
| 2019/0291859 A1* | 9/2019 | Manning | B64D 27/02 |
| 2020/0010183 A1* | 1/2020 | Kizhakkepat | B64C 27/50 |
| 2020/0172226 A1* | 6/2020 | Ni | B64C 1/30 |
| 2020/0277040 A1* | 9/2020 | Liu | B64C 11/28 |
| 2020/0398688 A1* | 12/2020 | Johnson | B60L 53/66 |

\* cited by examiner

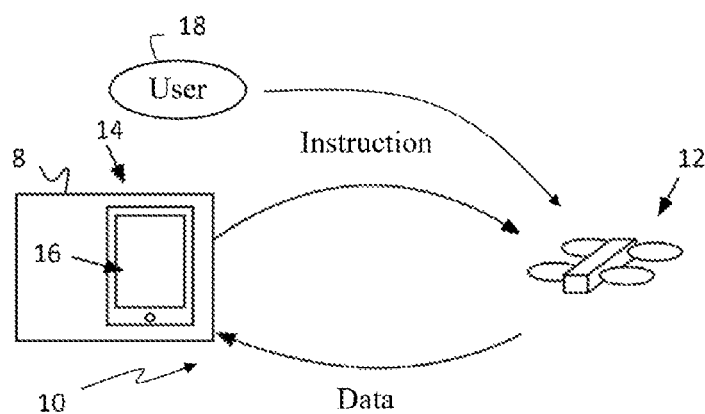
Fig. 1
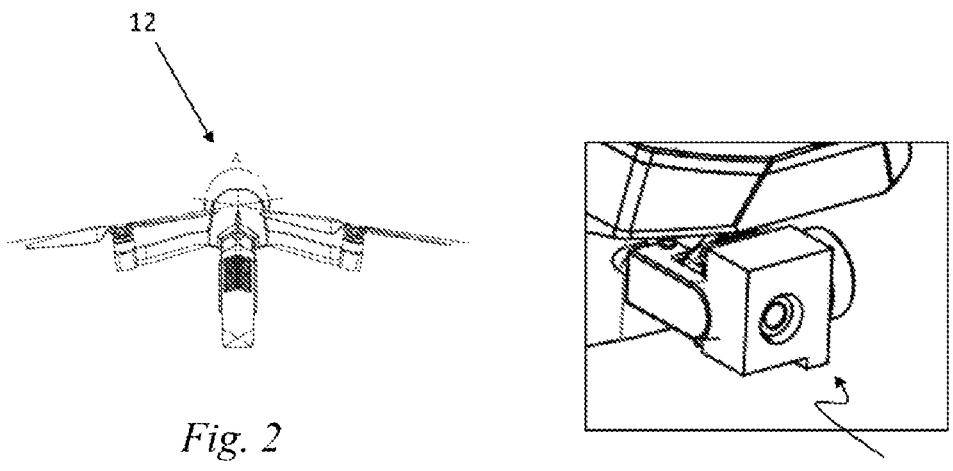
Fig. 2
Fig. 3

UNMANNED FLIGHT SYSTEMS AND CONTROL SYSTEMS THEREOF

RELATED APPLICATIONS

This application is a national entry of PCT/CN2019/121276 filed on Nov. 27, 2019, which claims priority to China Patent Application Serial No. 201911070318.6 filed on Nov. 5, 2019, which claims priority to U.S. Provisional Application Ser. No. 62/795,942 filed on Jan. 23, 2019.

TECHNICAL FIELD

The present disclosure relates generally to the field of unmanned flight systems, and more particularly, to an unmanned flight system, particularly a dual-rotor unmanned flight system, and a control system for an unmanned flight system.

BACKGROUND

Traditional unmanned flight systems (also known as "unmanned aircrafts") basically take the form of even-numbered rotors of four, six, or eight, because flight control algorithms and motion forms for unmanned flight systems with even-numbered rotors are usually simpler. By adjusting the rotation speed of each rotor, the lift of an unmanned aerial vehicle can be changed, so as to control the attitude and position of the unmanned flight system. However, due to the use of multiple rotors, the size of the traditional unmanned flight system is relatively large. In addition, with the same total weight of the unmanned flight system, the efficiency of the unmanned flight system with the same structure but different size of the rotors is also different. Specifically, compared with smaller rotors, in order to achieve the same lifting power, larger rotors rotate more slowly and require less power consumption, which is beneficial for improving efficiency and saving energy consumption. Therefore, compared with the traditional multi-rotor unmanned flight system, the dual-rotor unmanned flight system has superior flight efficiency and faster dynamic response.

Moreover, the traditional unmanned flight systems (such as four-rotor unmanned flight systems) usually adjust the rotation speed of each rotor to achieve the change of lift of the unmanned flight system, thereby controlling the attitude and position of the unmanned flight system. However, for example, four rotors need four motors to drive their rotations respectively, which consumes a relatively large amount of power. Under the premise that today's battery technology cannot make breakthrough progress, the duration of flight cannot be extended. In view of this, related technicians have developed a dual-rotor unmanned flight system. However, the existing dual-rotor unmanned flight system has a complicated structure and is very troublesome to be assembled. In addition, the transmission efficiency of the existing dual-rotor unmanned flight system is relatively low, and the duration of flight cannot be effectively extended.

SUMMARY

In order to solve at least one of the above technical problems, the present disclosure aims to provide an unmanned flight system, in particular a dual-rotor unmanned flight system, to overcome the shortcomings of the existing multi-rotor unmanned flight systems, such as short duration of flight, complex rotor assembly structure, troublesome assembly, slow horizontal flight speed, etc. With the same battery capacity and the same total weight of the unmanned flight system, the dual-rotor unmanned flight system according to the present disclosure can achieve faster horizontal flight speed, longer flight time, simple rotor assembly structure, and easier overall assembly and maintenance, and can also take off and land vertically like the existing multi-rotor unmanned flight systems.

To this end, according to a first aspect of the present disclosure, an unmanned flight system is provided, comprising: a body and a lift mechanism connected to the body, wherein the lift mechanism includes two rotor assembly arm structures respectively provided on two sides of the body, wherein each of the rotor assembly arm structures respectively includes: an arm, a pivotable rotor assembly, a motor for driving the rotor assembly to pivot about a pivot axis, and a motor base for mounting the motor, wherein one end of the arm is pivotally connected to one side of the body, the motor base is pivotally provided on the other end of the arm, and a rotational axis of the motor base is higher than a center of gravity of the unmanned flight system. In this way, during flight of the unmanned flight system, the rotor assembly arm structure can provide a moment to overcome the tilting of the unmanned flight system, thereby improving the flight stability.

In the first aspect according to the present disclosure, preferably, the height difference between the rotational axis of the motor base and the center of gravity of the unmanned flight system is greater than one eighth of the total length of the rotor assembly in a flight state.

In the first aspect according to the present disclosure, preferably, the height difference between the rotational axis of the motor base and the center of gravity of the unmanned flight system is less than four times the total length of the rotor assembly in the flight state.

In the first aspect according to the present disclosure, preferably, the rotor assembly arm structure is movable between an arm-unfolded position and an arm-folded position, wherein in the arm-unfolded position, the arms of the two rotor assembly arm structures are located on the two sides of the body at a first fixed angle to a transverse axis of the body, with the first fixed angle being preferably in a range of 0 to 55°; and in the arm-folded position, the arms are located on the two sides of the body at a second fixed angle to a longitudinal axis of the body, substantially parallel to the longitudinal axis of the body, with the second fixed angle being preferably in a range of 0 to 10°.

In the first aspect according to the present disclosure, preferably, in the arm-unfolded position, a third fixed angle is formed between the rotational axis of the motor base and the transverse axis of the body, wherein the third fixed angle is in a range of 0 to 25°.

In the first aspect according to the present disclosure, preferably, an angle between the rotational axis of the motor base and a rotational axis of the motor is in a range of 0 to 90°.

In the first aspect according to the present disclosure, preferably, the rotor assembly arm structures respectively include a limiting assembly for retaining the arm of the rotor assembly arm structure on the side of the body at the first fixed angle to the transverse axis of the body in the arm-unfolded position.

In the first aspect according to the present disclosure, preferably, the limiting assembly includes an arm limiting structure, a limiting block, and a spring, wherein in the arm-unfolded position, the spring loads the limiting block such that the limiting block can be engaged with the arm limiting structure to prevent the movement of the rotor assembly arm structure.

In the first aspect according to the present disclosure, preferably, the limiting assembly further includes a limiting unlocking component, the limiting unlocking component is connected to the limiting block, and the limiting unlocking component overcomes a force from the spring when being actuated to disengage the limiting block from the arm limiting structure.

In the first aspect according to the present disclosure, preferably, the arm is connected to the body via an elastic pivot.

In the first aspect according to the present disclosure, preferably, in the arm-unfolded position, the arms of the two rotor assembly arm structures are arranged in a substantially V-shape on the two sides of the body.

In the first aspect according to the present disclosure, preferably, the rotor assembly includes a first blade, a second blade, and a blade mounting assembly for connecting the first blade and the second blade, wherein the first blades and second blades are respectively mounted at two ends of the blade mounting assembly and are pivotable between a blade-unfolded position and a blade-folded position, wherein in the unfolded position, the first blades and second blades are respectively mounted on the blade mounting assembly in such a way that they are orientated in different directions; and in the blade-folded position, the first blades and second blades are mounted on a blade mounting assembly in such a way that they are orientated in the approximately same direction, such that the first blade at least partially overlaps with the second blade.

In the first aspect according to the present disclosure, preferably, the blade mounting assembly includes a mounting member and a mounting seat that are fixedly connected to each other, the first blades and second blades are respectively provided with a first blade mounting hole and a second blade mounting hole near an end of the blade mounting assembly, and the mounting member includes a first mounting post for passing through the first blade mounting hole and a second mounting post for passing through the second blade mounting hole, such that the first blades and second blades are pivotably connected to the blade mounting assembly.

In the first aspect according to the present disclosure, preferably, the mounting seat is fixed to the mounting member through a threaded connection.

In the first aspect according to the present disclosure, preferably, the mounting member includes a first end segment provided with the first mounting post, a second end segment provided with the second mounting post, and an intermediate segment; the mounting seat includes a first end containing segment containing the first mounting post, a second end containing segment containing the second mounting post, and an intermediate containing segment; and the first and second end segments are at an angle to the intermediate segment and are symmetrically provided on two sides of the intermediate segment, and the first and second end containing segments are at an angle to the intermediate containing segment and are symmetrically provided on two sides of the intermediate containing segment.

In the first aspect according to the present disclosure, preferably, the ends of the first and second blade near the blade mounting assembly are configured to be at an inclined angle to a blade reference plane.

In the first aspect according to the present disclosure, preferably, the rotor assembly arm structure further includes a rotation mechanism which connects the motor base to the arm, the rotation mechanism including: a servo motor provided in the arm for driving the motor base to rotate relative to the arm, and a gearbox connected to an end of the arm, the gearbox including at least: a housing, an input gear, and an output gear, wherein the input gear is connected to the servo motor, and the output gear is fixedly connected to the motor base via a fixing part.

In the first aspect according to the present disclosure, preferably, the gearbox further includes at least one intermediate gear, which is fixed onto a housing of the gearbox and connected between the input gear and the output gear for transmission.

In the first aspect according to the present disclosure, preferably, the rotor assembly arm structure includes a containing portion, and a power cable of the motor extends through the containing portion along the outside of the rotation mechanism inside the arm and is then connected to a power source.

In the first aspect according to the present disclosure, preferably, the unmanned flight system is an unmanned aerial vehicle, and further includes: a communication system for sending and/or receiving information to/from a controller; a processing system for receiving operation instructions from the communication system, and controlling the components of the unmanned flight system based on the operation instructions; a shooting system for obtaining image data; and a power source for powering active components of the unmanned flight system.

In the first aspect according to the present disclosure, preferably, the unmanned flight system further includes an optical system for recording images of a physical space near the unmanned flight system, wherein the optical system includes at least one optical sensor.

In the first aspect according to the present disclosure, preferably, the unmanned flight system further includes an obstacle detection and avoidance system, which includes: at least two ultra-wide-angle lens cameras equipped coaxially at the center top and center bottom of the body; a memory connected to the ultra-wide-angle lens cameras for storing camera measurements; and a vision processor connected to the ultra-wide-angle lens cameras for real- or near-real time image processing.

In the first aspect according to the present disclosure, preferably, the obstacle detection and avoidance system further includes: a sensor for sampling a signal indicative of the operation of the system, and the sensor includes at least one or more of an orientation sensor, an acoustic sensor, an optical sensor, a touch sensor, and a position sensor.

According to a second aspect of the present disclosure, a control system for an unmanned flight system is provided, the control system including the above-mentioned unmanned flight system and a system controller.

BRIEF DESCRIPTION OF THE DRAWINGS

FIG. 1 is a schematic view of a system including an unmanned flight system and an apparatus for controlling the unmanned flight system according to a preferred embodiment of the present disclosure;

FIG. 2 is a front view of an exemplary unmanned flight system according to a preferred embodiment of the present disclosure;

FIG. 3 is a perspective view of an exemplary optical system according to a preferred embodiment of the present disclosure;

DETAILED DESCRIPTION

Figure 4:
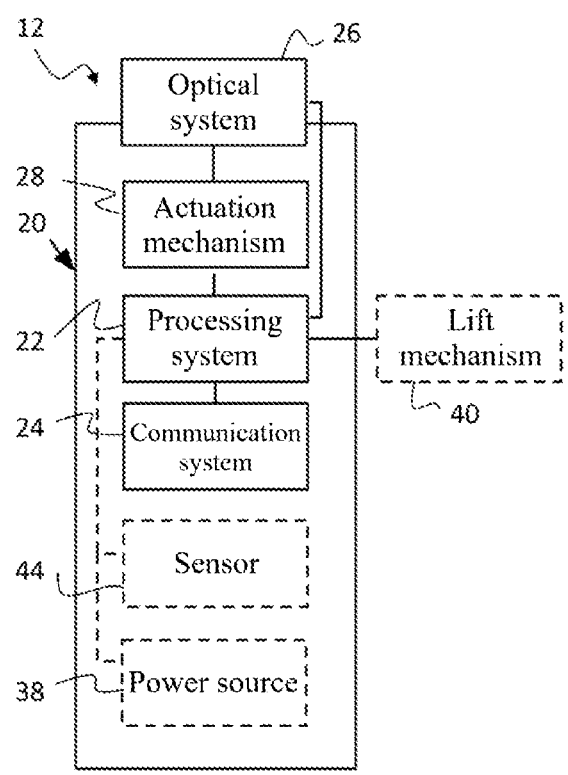
FIG. 4 is a block diagram of an unmanned flight system according to a preferred embodiment of the present disclosure.

In the present disclosure, unless otherwise stated, the terms "first", "second", etc., used to describe various elements are not intended to limit the positional, temporal or importance relationship of these elements, but rather only to distinguish one element from the other. In some examples, the first element and the second element may point to the same instance of this element, and in some cases, based on contextual descriptions, they may also refer to different instances.

The terms used in the description of the various examples in the present disclosure are merely for the purpose of describing particular examples, and are not intended to be limiting. Unless the context clearly indicates otherwise, if the number of elements is not specifically defined, the elements may be one or more. Moreover, the term "and/or" used in the present disclosure encompasses any of and all possible combinations of listed items.

1. Control System

A control system 10 for manipulating an unmanned flight system 12 according to a preferred embodiment of the present disclosure will be described below with reference to FIG. 1. The control system 10 includes an unmanned flight system 12 and an apparatus (system controller 14) for controlling the unmanned flight system 12, as shown in FIG. 1.

The control system 10 may include a system controller 14 having a control client 16. In a preferred embodiment, the system controller 14 may be a remote control device. The system controller 14 may be provided in an apparatus such as a ground station, a remote controller, or a mobile phone, for example. The control client 16 provides a user interface that allows a user 18 to send instructions to the unmanned flight system 12 to control operation thereof. Furthermore, as discussed in more depth below, the unmanned flight system 12 may include one or more cameras for obtaining pictures and/or video which may be sent to the system controller 14 and/or stored in a memory on the unmanned flight system 12. In a preferred embodiment of the present disclosure, the system controller 14 may also include a hand-held remote control device 8. The hand-held remote control device 8 provides support for the unmanned flight system 12 and the system controller 14. The hand-held remote control device 8 may further include a quick catch and release mechanism for controllable catching and releasing of the unmanned flight system 12 during take-off and landing operations, respectively.

The system controller 14 may function to display data (e.g., as instructed by the control client 16), receive user inputs, compute operation instructions based on the user inputs (e.g., as instructed by the control client 16), send the operation instructions to the unmanned flight system 12, store control client information (e.g., associated unmanned flight system identifiers, security keys, user account information, user preferences, etc.), or perform any other suitable function.

The system controller 14 may be a user device (e.g., a smartphone, a tablet, a laptop, a watch, a wearable apparatus, etc.), a networked server system, a remote server system, or any other suitable remote computing system. Herein, the remote computing system functions to receive and assist user input, and can also automatically generate control instructions for this and send the control instructions to an unmanned flight system(s) 12, and each unmanned flight system 12 can be controlled by one or more remote computing systems. The remote computing system preferably controls the unmanned flight system 12 through a control client (e.g., a native application, a browser application, etc.), but the unmanned flight system 12 can be controlled in other ways. When the system controller 14 is configured as a user device, the user device may include a power storage device (e.g., a battery), a processing system (e.g., a CPU, a GPU, a memory, etc.), a user output device (e.g., a display, a speaker, a vibration mechanism, etc.), a user input device (e.g., a keyboard, a touch screen, a microphone, etc.), a positioning system (e.g., a GPS system), a sensor (e.g., an optical sensor (e.g., a light sensor and a camera), an orientation sensor (e.g., an accelerometer, a gyroscope, and an altimeter), an audio sensor (such as a microphone, etc.), a data communication system (e.g., a Wi-Fi module, BLE, a cellular module, etc.), or any other suitable assembly.

In a preferred embodiment, the system controller 14 includes one or more sensors that detect or sense operations or actions performed by the user 18 to control the operation of the unmanned flight system 12 without physical interaction with the system controller 14 under certain conditions, for example, when the unmanned flight system 12 is too far from the user 18. Accordingly, the unmanned flight system 12 may include one or more sensors for detecting or sensing operations or actions performed by the user 18 to control operation of the unmanned flight system 12 (see below).

As an alternative, without physical interaction with the system controller 14, the entire control loop from start (release and hover) to finish (flight and capture), as well as controlling various motions of the unmanned flight system 12 and trigger of events, e.g., taking pictures and video, may also performed solely on board the unmanned flight system 12 without involvement of the system controller 14. In this case, the control system 10 may be configured to enable the user 18 to interact with the unmanned flight system 12 without the system controller 14. Herein, the control of the unmanned flight system 12 can be performed by the user through user expression without utilization of the system controller 14. The user expression may include, but is not limited to, any action performed by the user that do not include physical interaction with the system controller 14, including thought (through brain wave measurement), facial expression (including eye movement), gesture and/or speech. In such embodiments, user instructions are received directly via the optical sensor 36 and at least some of the other sensors 44 and processed by an on-board processing system 22 to control the unmanned flight system 12.

Without physical interaction with the system controller 14, however, a display of the system controller 14 may be used to display images and/or video acquired from the unmanned flight system 12 which may aid the user 18 in controlling the unmanned flight system 12. In addition, the sensors 36, 44 associated with the system controller 14, e.g., camera(s) and/or a microphone (not shown) may transfer data to the unmanned flight system 12, e.g., when the unmanned flight system 12 is too far away from the user 18. The sensor data relayed from the system controller 14 to the unmanned flight system 12 is used in the same manner as the sensor data from the on-board sensors 36, 44 are used to control the unmanned flight system 12 using the user expression.

In this manner, the unmanned flight system 12 may be fully controlled, from start to finish without physical interaction with the system controller 14, even without utilization of a system controller 14. The unmanned flight system 12 is controlled based on user instructions received at various on-board sensors 36, 44, for example. It should be noted that in the following discussion, utilization of on-board sensors 36, 44 may also include utilization of corresponding or similar sensors on the system controller 14. In general, the user 18 may utilize certain gesture and/or speech control to control take-off, landing, motion of the unmanned flight system 12 during flight and other features, such as triggering of photo and/or video capturing.

As can be seen in FIG. 1, the system controller 14 may include a control client 16 for receiving (such as images and/or video) data from the unmanned flight system 12 and displaying same visually on the system controller 14. The control client 16 can also be used to receive an operation instruction (for example, sent by the user 18) and assist the remote control of the unmanned flight system 12 based on the operation instruction. The control client 16 is preferably constructed directly on the system controller 14, but alternatively the control client 16 may also be constructed on the unmanned flight system 12 or on any other suitable system. In this case, the user can only control the unmanned flight system 12 without direct or physical interaction with the system controller 14. The control client 16 may be a native application (e.g., a mobile application), a browser application, an operating system application, or any other suitable configuration.

The system controller 14 may include one or more of: an output device, an input device, a communication system, a sensor, a power source, a processing system (e.g., CPU, memory, etc.), or any other suitable component. The output device may include: a display (e.g., an LED display, an OLED display, an LCD, etc.), an audio speaker, a light (e.g., an LED), a tactile output device (e.g., a tixel system, a vibratory motor, etc.), or any other suitable output device. The input device may include: a touchscreen (e.g., capacitive, resistive, etc.), a mouse, a keyboard, a motion sensor, a microphone, a biometric input device, a camera, or any other suitable input device. The communication system may include a wireless connection, such as a radio supporting system: a long-range system (e.g., Wi-Fi, cellular, WLAN, WiMAX, microwave, IR, radio frequency, etc.), a short-range system (e.g., BLE, BLE long range, NFC, ZigBee, RF, audio, optical, etc.), or any other suitable communication system. The sensor may include: an orientation sensor (e.g., an accelerometer, a gyroscope, etc.), an ambient light sensor, a temperature sensor, a pressure sensor, an optical sensor, an acoustic sensor, or any other suitable sensor. In one variation, the system controller 14 may include a display (e.g., a touch-sensitive display including a touchscreen overlaying the display), a set of radios (e.g., Wi-Fi, cellular, BLE, etc.), and a set of orientation sensors. However, the system controller 14 may include any suitable set of components.

The unmanned flight system 12 (also known as unmanned aircraft) functions to fly within a physical space, capture images or video, transmit the obtained images or video in near-real time to the system controller 14, and operate based on operation instructions received from the system controller 14. The unmanned flight system(s) 12 is optionally used with the system controller 14 or with any other suitable system. In a preferred embodiment, the unmanned flight system 12 is a rotorcraft (e.g., a quadcopter, a helicopter, a cyclocopter, etc.). However, the unmanned flight system 12 may alternatively be a fixed-wing aircraft, aerostat, or any other suitable unmanned flight system. The unmanned flight system 12 may include a body 20, a lift mechanism 40, a power source 38, sensors 36, 44, a processing system 22, a communication system 24, and/or include any other suitable component (described in detail below).

Before transmitting the video to the system controller 14, the unmanned flight system 12 may additionally pre-process the obtained images, video (e.g., video frames) and/or audio received from the on-board audio sensor, and based on its own operation instructions, generate and automatically run (for example, follow objects automatically), or perform any other suitable function. The unmanned flight system 12 may also additionally function to move the optical sensor's field of view (FOV) within the physical space. For example, the unmanned flight system 12 can control macro movements (e.g., large FOV changes, on the order of meter adjustments), micro movements (e.g., small FOV changes, on the order of millimeter or centimeter adjustments), or any other suitable motion.

The unmanned flight system 12 can perform certain functions based on on-board processing of sensor data from on-board sensors. The functions may include, but are not limited to:

Take-off and landing;
Owner recognition;
Facial recognition;
Speech recognition;
Facial expression and gesture recognition; and,
Control (e.g., motion) of the unmanned flight system based on owner, facial, expression and gesture recognition, and speech recognition.

Hereinafter, the mechanical system, electrical system, and control method of the unmanned flight system 12 according to a preferred embodiment of the present disclosure will be described in further detail.

2. Mechanical System of the Unmanned Flight System

In the present disclosure, the unmanned flight system 12 preferably has two sides mirrored with each other, and has a corresponding assembly on each side of the unmanned flight system. When the description applies to two assemblies, a single reference number can be used to refer to both left and right (viewed along a longitudinal axis of the unmanned flight system) assemblies. When the description refers specifically to a left or right assembly, a specific reference numeral functions to clearly refer to the specific left or right assembly. For example, "rotor assembly 42" can be used to describe both the left rotor assembly and the right rotor assembly, and "rotor assembly 42A" and "rotor assembly 42B" used in the description refer specifically to the left rotor assembly and the right rotor assembly, respectively.

The mechanical system of the unmanned flight system 12 according to a preferred embodiment of the present disclosure will be described below with reference to FIGS. 2 and 7 to 17. As shown in FIGS. 2 and 7-9, the unmanned flight system 12 (e.g., a dual-rotor unmanned flight system) may include a body 20 and a lift mechanism 40.

In this preferred embodiment, the body 20 of the unmanned flight system 12 functions to support other components and to mechanically protect and/or retain each component. The body 20 may include a cavity, or the body 20 may be a platform, housing, or have any suitable configuration. The body 20 may be enclosed, open (e.g., a truss), or have any suitable construction. The body 20 may be made of metal, plastic (e.g., polymer), carbon composite, or any other suitable material. The body 20 may have, for example, a first end 20A (front end) and a second end 20B (back end). The body 20 may define a longitudinal axis, a lateral axis, a transverse axis, a front end, a back end (e.g., opposing the front end along the longitudinal axis), a top, a bottom (e.g., opposing the top along the transverse axis), or any other suitable reference. In one preferred variation, during the flight of the unmanned flight system 12, the transverse axis of the body 20 may be substantially parallel to a gravity vector (e.g., perpendicular to a ground plane), and the longitudinal and lateral axes of the body may be substantially perpendicular to the gravity vector (e.g., parallel to the ground plane).

The body 20 preferably substantially contains (e.g., encapsulates) the communication system 24, the power source 38, and the processing system 22, but can be otherwise configured. Herein, the power source 38 in the form of a battery is contained in and forms part of the body 20. In one variation, the body 20 also includes first and second frames extending parallel to a rotational plane of the rotor and arranged along first and second sides of the body 20. The frames now can function as an intermediary component between the rotors and a retention mechanism (e.g., such as a user's hand). The frames may extend along a single side of the body 20 (e.g., along the bottom or top of the rotors), or along the first and second sides of the body 20 (e.g., along the top and bottom of the body 20). The frames may be statically mounted or actuatably mounted to the body 20.

The frame of the body 20 may include one or more apertures (e.g., airflow apertures) for fluidly connecting one or more of the rotors to an ambient environment, which enable the flow of air and/or other suitable fluid between the ambient environment and the rotors (e.g., enabling the rotors to generate an aerodynamic force that causes the unmanned flight system 12 to move throughout the ambient environment). The apertures may be elongated, or may have comparable length and width. The apertures may be substantially identical, or may differ from each other. The apertures are preferably sized to be small enough to prevent components of the retention mechanism (e.g., fingers) from passing through the apertures. The frame near the rotors may be preferably configured to have a geometrical transparency (e.g., a large ratio of opening area to total area) to enable the flight of the unmanned flight system, and more preferably enabling high-performance flight maneuvering. For example, each aperture may be smaller than a threshold size (e.g., smaller than the threshold size in all dimensions, elongated slots narrower than but significantly longer than the threshold size, etc.). In a specific example, the frame has a geometrical transparency of 80-90%, and each of the apertures (e.g., circles, polygons such as regular hexagons, etc.) defines a circumscribed circle with a diameter of 12-16 mm. However, the body can be otherwise configured.

The body 20 (and/or any other suitable component of the unmanned flight system 12) may define a retention region that can be retained by a retention mechanism (e.g., a hand, an unmanned flight system dock or a claw, etc.). The retention region is preferably configured to surround a portion of one or more of the rotors, more preferably completely surround all the rotors, thereby preventing any unintentional interaction between the rotors and a retention mechanism or another object near the unmanned flight system 12. For example, a projection of the retention region onto an unmanned flight system plane (e.g., a lateral plane, a rotor plane, etc.) can (e.g., partially, completely, a majority of, at least 90% of, etc.) overlap a projection of a swept area of one or more of the rotors (e.g., a swept area of a rotor, the total swept area of the set of rotors, etc.) onto the same unmanned flight system plane.

In this preferred embodiment, the lift mechanism 40 of the unmanned flight system 12 functions to enable the flight of the unmanned flight system. The lift mechanism 40 preferably includes a pivotable rotor assembly 42 driven by a motor 82, but can alternatively include any other suitable propulsion mechanism. The lift mechanism 40 is preferably mounted to the body 20 and controlled by the processing system 22, but can alternatively be otherwise mounted to the unmanned flight system 12 and/or controlled. In a preferred embodiment, the unmanned flight system 12 may include a plurality of lift mechanisms 40. In one example, the unmanned flight system 12 includes two lift mechanisms 40. Preferably, the lift mechanisms 40 are substantially evenly distributed about the perimeter of the unmanned flight system 12. However, the lift mechanisms 40 can be otherwise configured.

The lift mechanism 40 of the unmanned flight system 12 functions to provide lift, and preferably includes a set of rotor assembly arm structures driven individually or collectively by one or more motors (e.g., two motors). Each of the rotor assembly arm structures respectively includes: an arm 72, a pivotable rotor assembly 42, a motor 82 for driving the rotor assembly 42 to pivot about a pivot axis, and a motor base 84 for mounting the motor, wherein one end of the arm 72 is pivotally connected to one side of the body 20, the motor base 84 is pivotally provided on the other end of the arm 72, and a rotational axis of the motor base is higher than a center of gravity G of the unmanned flight system (see FIG. 20D). In this way, during flight, the rotor assembly arm structures can provide a torque to overcome the tilting of the unmanned flight system, thereby improving the flight stability of the unmanned flight system. Preferably, the height difference H (see FIG. 20D) between the rotational axis of the motor base and the center of gravity of the unmanned flight system is greater than one-eighth of the total length L (see FIG. 20D) of the rotor assembly 42 in a flight state, preferably greater than a quarter of the total length L of the rotor assembly 42 in the flight state, and particularly preferably greater than a half of the total length L of the rotor assembly 42 in the flight state; and preferably, the height difference between the rotational axis of the motor base and the center of gravity of the unmanned flight system is less than four times the total length L of the rotor assembly 42 in the flight state, and in particular less than twice the total length L of the rotor assembly 42 in the flight state. As an example, the height difference H is, for example, three times the total length of the rotor assembly 42. As another example, the height difference H is, for example, equal to the total length of the rotor assembly 42. Herein, the "total length of the rotor assembly 42 in the flight state" may be, for example, the sum of the lengths of two blades 80A, 80B.

In this preferred embodiment, each rotor is preferably configured to rotate about a corresponding rotor axis (i.e., a motor axis $A_M$), defines a corresponding "rotor plane" perpendicular to its rotor axis, and sweeps out a "swept area" on its rotor plane. The motors 82 are preferably configured to provide sufficient power to the rotors to enable the flight of the unmanned flight system, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During flight of the unmanned flight system, the set of rotors are preferably configured to cooperatively or individually generate (e.g., by rotating about their rotor axes) substantially all (e.g., more than 99%, more than 95%, more than 90%, or more than 75%) of the total aerodynamic force generated by the unmanned flight system 12 (possibly excluding a drag force generated by the body 20 such as during flight at high airspeeds). Alternatively, or additionally, the unmanned flight system 12 may include any other suitable flight components that function to generate forces for the flight of the unmanned flight system, such as jet engines, rocket engines, wings, solar sails, and/or any other suitable force-generating components. In the illustrated embodiments, the lift mechanism 40 of the unmanned flight system 12 includes two rotor assemblies 42 (see below).

Figure 7:
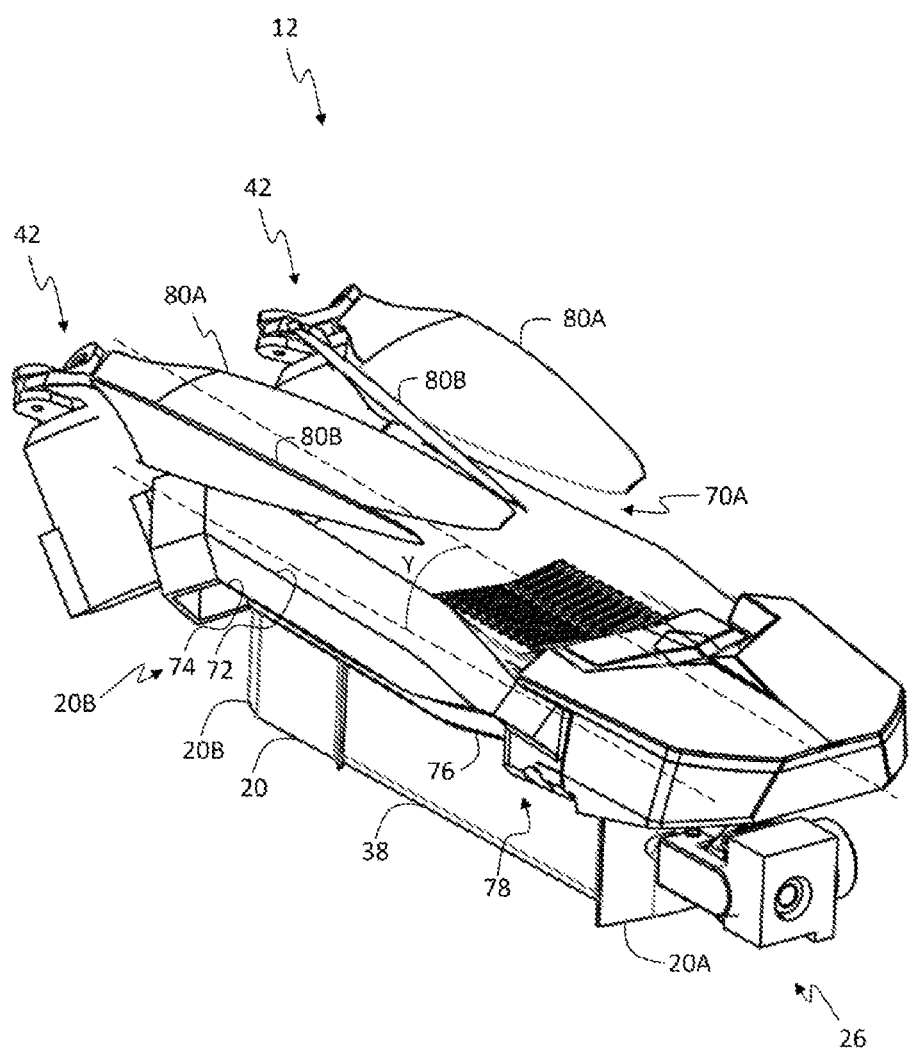
FIG. 7 is a perspective view of an unmanned flight system in a folded state according to a preferred embodiment of the present disclosure.
Figure 8:
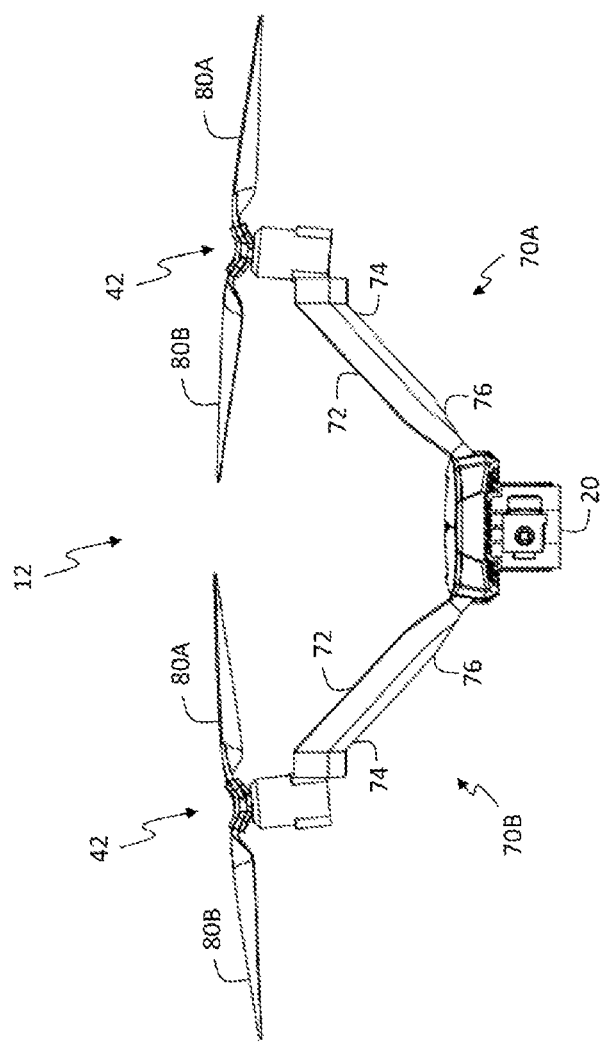
FIG. 8 is a front view of an unmanned flight system in an unfolded state according to a preferred embodiment of the present disclosure.
Figure 9:
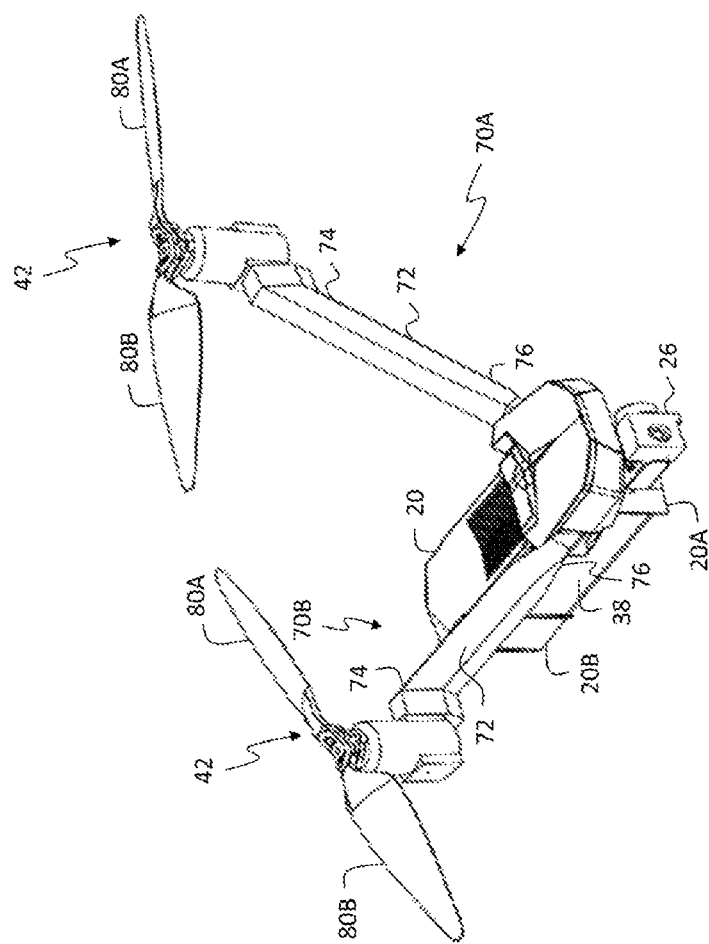
FIG. 9 is a perspective view of an unmanned flight system in an unfolded state according to a preferred embodiment of the present disclosure.
Figure 20A:
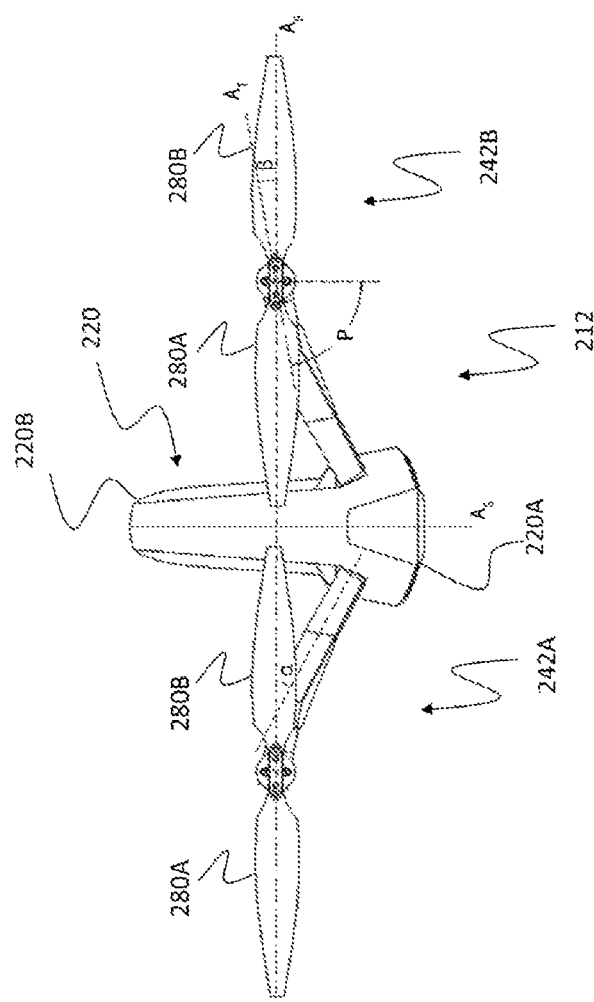
FIG. 20A is a schematic top view of an unmanned flight system 212 in a hovering position according to a preferred embodiment of the present disclosure.

In this preferred embodiment, it can be seen from FIGS. 7 to 9 that the rotor assembly arm structure can move between an arm-unfolded position and an arm-folded position. In the "arm-unfolded position", the arms 72 of the two rotor assembly arm structures are located on two sides of the body at a first fixed angle α (see FIG. 20A) to the transverse axis AB of the body 20, wherein the first fixed angle α is preferably in a range of 0 to 55°, for example, in a range of 10° to 50°, and particularly preferably in a range of 25° to 45°. It should be understood that the angle α may also be any other angle. Herein, in the arm-unfolded position, the arms 72 of the two rotor assembly arm structures are arranged in a substantially V-shape on the two sides of the body. It is also considered that when the shape of the arms is changed, the arms may be arranged on the two sides of the body in other forms, such as in a U-shape. In the "arm-folded position", the arms 72 may be substantially parallel to the longitudinal axis of the body and should be attached to the body as much as possible. In this case, the arms 72 are located on the two sides of the body at a second fixed angle γ (see FIG. 7) to the longitudinal axis $A_s$ of the body, and preferably the second fixed angle γ is in a range of 0 to 10°, for example, the second fixed angle is less than 5°. In order to maintain the balance of the unmanned flight system in an unfolded state, in the "arm-unfolded position", a third fixed angle β is formed between the rotational axis $A_T$ of the motor base and the transverse axis AB of the body, as shown in FIG. 20A. Herein, the transversal axis AB of the body coincides with a line connecting the centers of the two motor bases. In this preferred embodiment, the third fixed angle β is in a range of 0 to 25°, for example, the third fixed angle β is less than 15°, especially less than 10°, which is beneficial for maintaining the stability of the unmanned flight system in the flight state. In order to achieve the foldability of the rotor assembly arm structure, the arm 72 is connected to the body via an elastic pivot.

Figure 21:
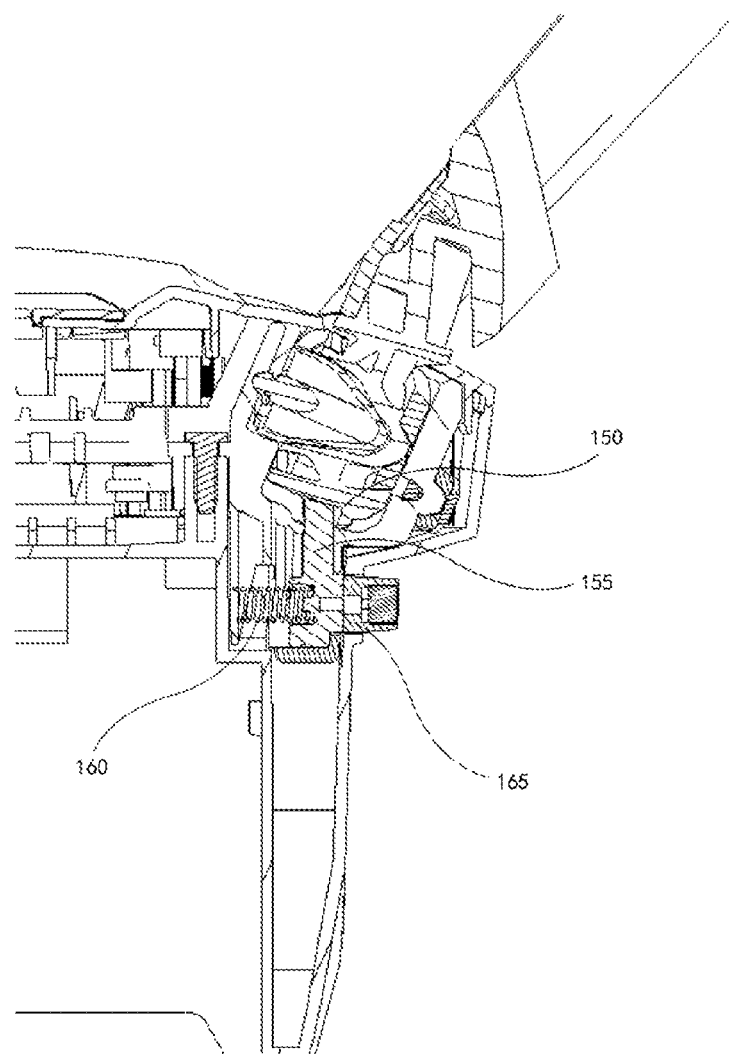
FIG. 21 is a sectional view of a limiting assembly according to a preferred embodiment of the present disclosure.

In a preferred embodiment, the two rotor assembly arm structures respectively further include a limiting assembly, which functions to retain the arm of the rotor assembly arm structure on the side of the body at a fixed angle to the longitudinal axis $A_s$ of the body in the arm-unfolded position. Referring to FIG. 21, the limiting assembly includes a limiting hole recess 150, a limiting block 155, and a spring 160. Herein, the spring 160 always loads the limiting block. When the arm moves to the "arm-unfolded position", the limiting block 155 can be engaged with the arm limiting structure 150 under a spring force from the spring 160. In this way, the arm 72 is locked in the arm-unfolded position. The elastic pivot and the limiting assembly increase the twisting force of the arm in the arm-unfolded position, and more reliably fix the arm in the unfolded state. Any other form of the limiting assembly can also be considered to fix the arms in the arm-unfolded position. Preferably, the limiting assembly further includes a limiting unlocking component 165. The limiting unlocking component 165 is connected to the limiting block 155. When the arm needs to be moved away from the "arm-unfolded position", the user actuates the limiting unlocking component 165 (for example, moving to the left in FIG. 21), whereby the limiting block 155 moves to the left against the force from the spring 160, such that the limiting block 155 is disengaged from the arm limiting structure 150, and the user moves the arms to adjust the respective arms into the "arm-folded position".

As shown with reference to FIGS. 8 and 9, in this preferred embodiment, each rotor assembly 42 includes two blades, that is, a first blade 80A and a second blade 80B, and each rotor assembly 42 includes a blade mounting assembly for connecting the first blade 80A and the second blade 80B.

Herein, the first blade 80A and the second blade 80B are respectively mounted at two ends of the blade mounting assembly and can be pivoted between a blade-unfolded position and a blade-folded position. In the blade-unfolded position, the first blade 80A and the second blade 80B are respectively mounted on the blade mounting assembly in such a way that they are orientated in different directions. In the blade-folded position, the first blade 80A and the second blade 80B are mounted on the blade mounting assembly in such a way that they are orientated in the approximately same direction, such that the first blade 80A at least partially overlaps with the second blade 80B (see FIG. 7). In the embodiment shown in FIG. 7, the first blade 80A and the second blade 80B are folded together approximately along the longitudinal axis of the body 20 to reduce the volume of the entire folded flight system as much as possible and improve the portability.

Figure 10:
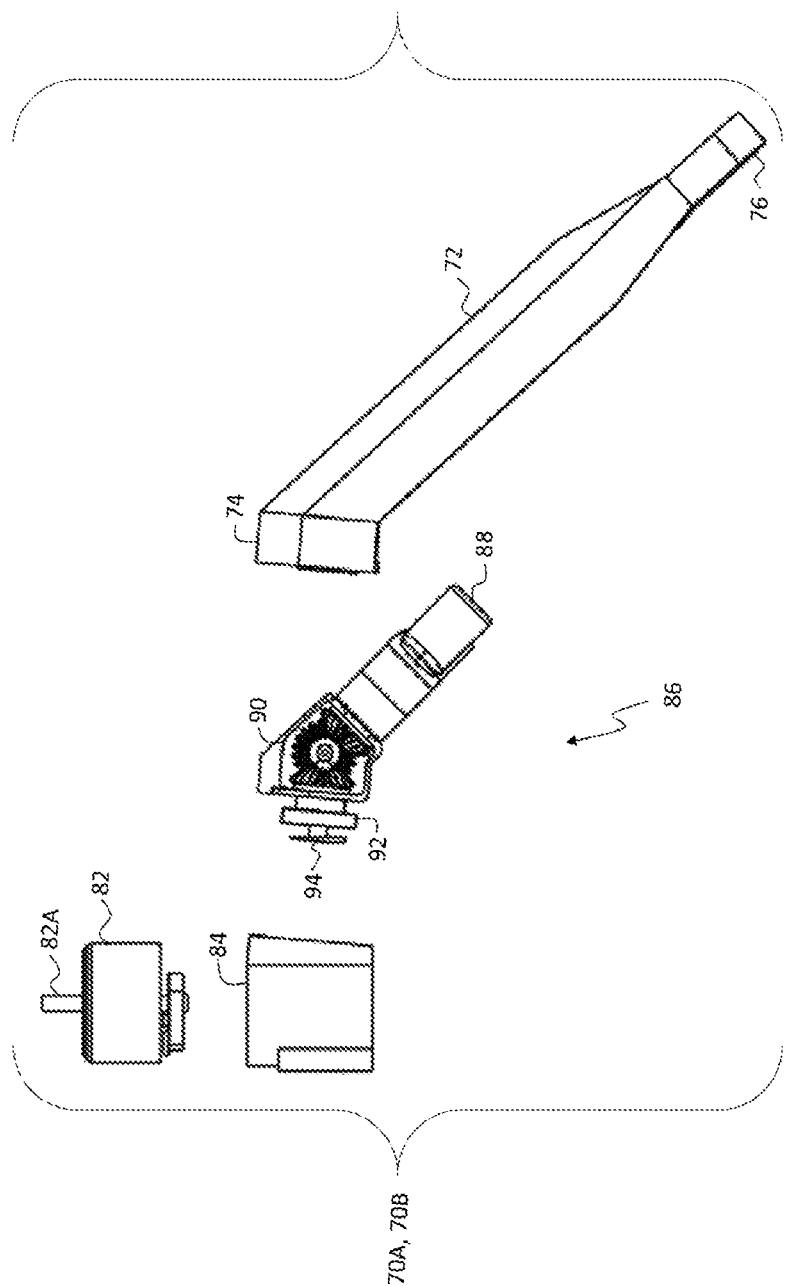
FIG. 10 is an exploded view of a rotation mechanism of an unmanned flight system according to a preferred embodiment of the present disclosure.

Referring to FIG. 10, in this preferred embodiment, each lift mechanism 40 includes a corresponding motor 82 and motor base 84. The motor 82 drives the respective rotor assemblies 42A, 42B to rotate about a motor axis $A_M$ defined by a shaft 82A of the motor 82. Through controlled rotation of the rotor assemblies 42A, 42B about the rotor axis and rotation of the rotor assemblies 42A, 42B relative to the respective arms 72, controlled flight of the unmanned flight system 12 can be achieved. As discussed further below, since control of the flight of the unmanned flight system 12 is achieved by rotation of the rotor assemblies 42A, 42B relative to the respective arms 72, the body 20 (or fuselage) is generally not tilted. This minimizes the surface wind resistance of the unmanned flight system 12 in the direction of movement.

With particular reference to FIG. 10, in the illustrated embodiment, rotation of the rotor assembly 42A, 42B relative to the respective arm 72 is performed by a respective rotation mechanism 86, and the motor base 84 is connected to the respective arm 72 via the rotation mechanism. In this way, the rotation mechanism 86 controllably rotates the motor 82 relative to the arm 72. Each rotation mechanism 86 includes a servo motor 88 and a gearbox 90. The servo motor 88 is provided in the arm and is connected to the motor base 84 via the gearbox 90 for driving the motor base 84 to rotate relative to the arm 72. The gearbox 90 is connected to an end of the arm (fixed to a connection end 74 of the arm 72), and the gearbox includes at least: a housing 92, an input gear 98, and an output gear 102, wherein the input gear 98 is connected to the servo motor 88, and the output gear 102 is fixedly connected to the motor base 84 via a fixing part 94. The gearbox 90 may also include a bearing 92 and the fixing part 94. When the space permits, it can be also considered that a steering gear may be used in place of the gearbox 90. It can be seen from the figures that at least a part of the rotation mechanism 86, such as the servo motor 88, can be contained within an interior cavity of the arm 72. In another alternative embodiment, one or more servo motors (a plurality of servo motors) are directly coupled to and drive the rotor assembly 42A, 42B and are coaxial with the rotor assembly 42A, 42B, in which case the gearbox 90 may be omitted.

Figure 11:
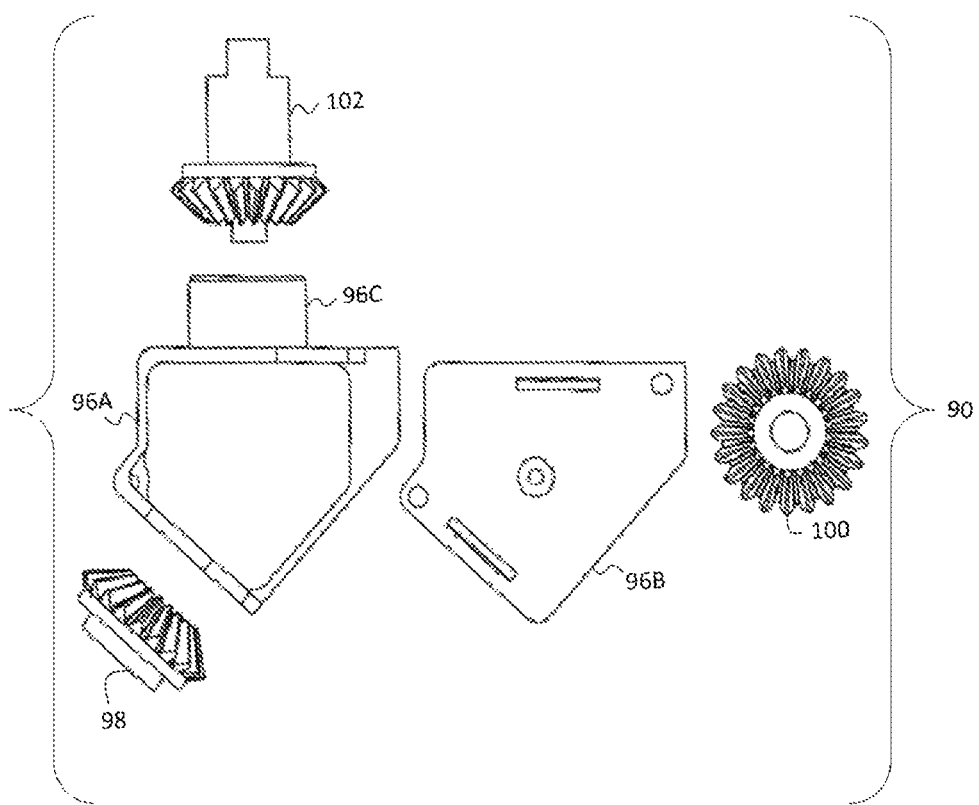
FIG. 11 is an exploded view of a first rotation mechanism of the rotation mechanism of FIG. 10 according to a preferred embodiment of the present disclosure.
Figure 12:
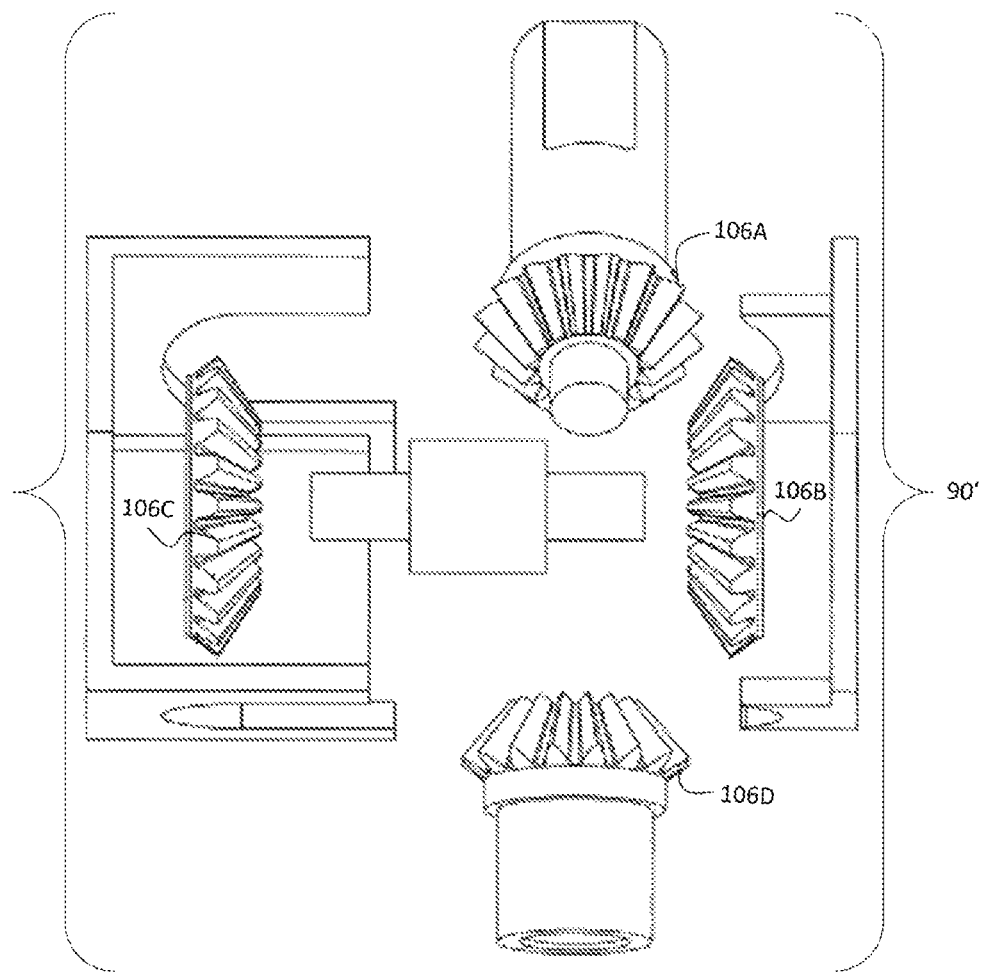
FIG. 12 is an exploded view of a second rotation mechanism of the rotation mechanism of FIG. 10 according to a preferred embodiment of the present disclosure.
Figure 13:
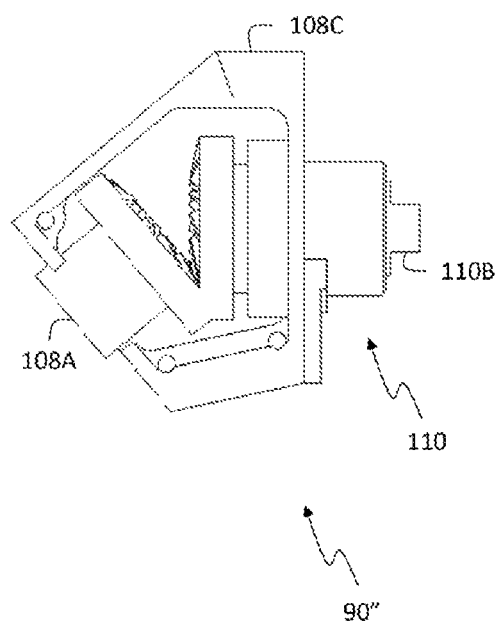
FIG. 13 is a schematic view of a third rotation mechanism of the rotation mechanism of FIG. 10 according to a preferred embodiment of the present disclosure.

FIGS. 11 to 13 respectively show three embodiments of the gearbox.

In the first embodiment of the gearbox 90 shown in FIG. 11, the gearbox 90 includes a gearbox housing 96 formed from a gearbox body 96A and a gearbox cover 96B. The gearbox housing 96 contains a first gear 98 (input gear), a second gear 100 (intermediate gear), and a third gear 102 (output gear). The first gear 98 is connected to an output shaft of the servo motor 88. The second gear 100 is fixed inside the gearbox housing 96 via a positioning structure which is located on and connected to a positioning structure on a side face of the gearbox. The positioning structure is located on an inner surface of the gearbox housing 96. In an alternative embodiment, the gearbox 90 may include two, three or more second gears on the respective positioning structures. The third gear 102 is connected to the motor base 84 via the bearing 92. The motor base 84 and an output shaft of the third gear 102 are connected via the fixing part 94.

A second embodiment of the gearbox 90' is shown in FIG. 12. Herein, an input gear 106A simultaneously drives two intermediate gears 106B, 106C. The two intermediate gears 106B, 106C are fixed onto the housing 92 of the gearbox and connected between the input gear and the output gear for transmission, specifically, rotating in opposite directions and driving the output gear 106D.

Figure 14:
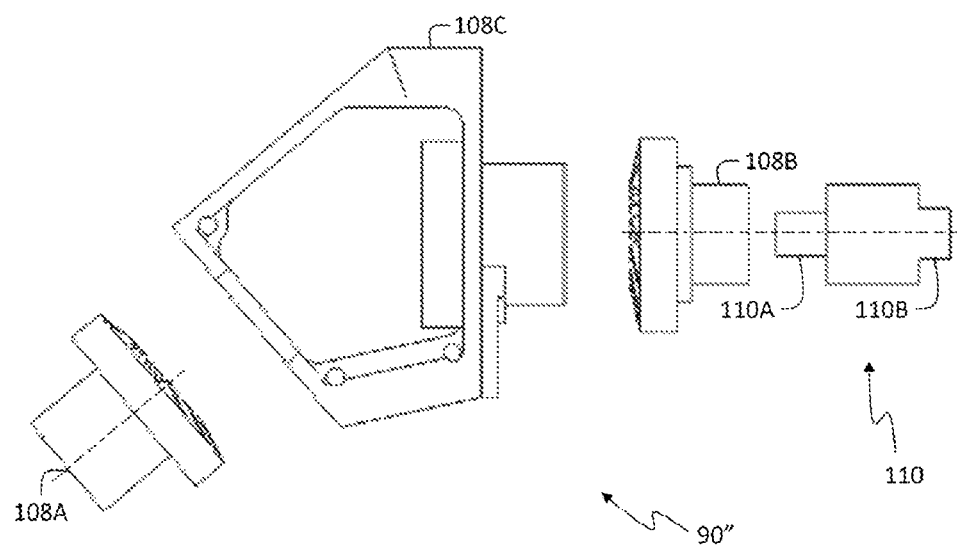
FIG. 14 is an exploded view of the third rotation mechanism of FIG. 13 according to a preferred embodiment of the present disclosure.

A third embodiment of the gearbox 90" is shown in FIGS. 13 and 14. The gearbox 90" includes an input gear 108A and a steering gear 108B. The input gear 108A is connected to, and driven by, the servo motor 88. A first end 110A of a connecting shaft 110 is connected to the steering gear 108B. A second end 110B of the connecting shaft 110 is connected to the motor base 84. In this embodiment, the intermediate gear is omitted, and only two gears are needed for transmission.

Figure 22:
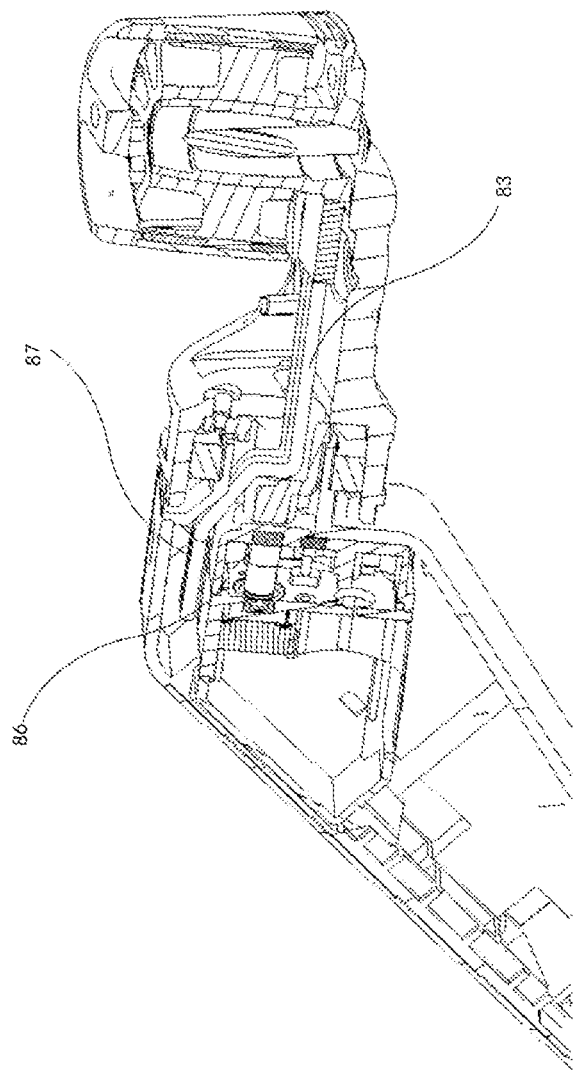
FIG. 22 is a sectional view of a part of the rotor assembly arm structure according to a preferred embodiment of the present disclosure.

In addition, it can be seen from FIG. 22 that the rotor assembly arm structure includes a containing portion 87, and a power cable 83 of the motor 82 can extend through the containing portion 87 along the outside of the rotation mechanism 86 inside the arm 72 and is then connected to a power source, thereby preventing the cable from being exposed to the outside of the arm, so that the system is more aesthetically appealing and safer, while preventing the power cable 83 and the gearbox from interfering with each other.

Figures 15A, 15B:
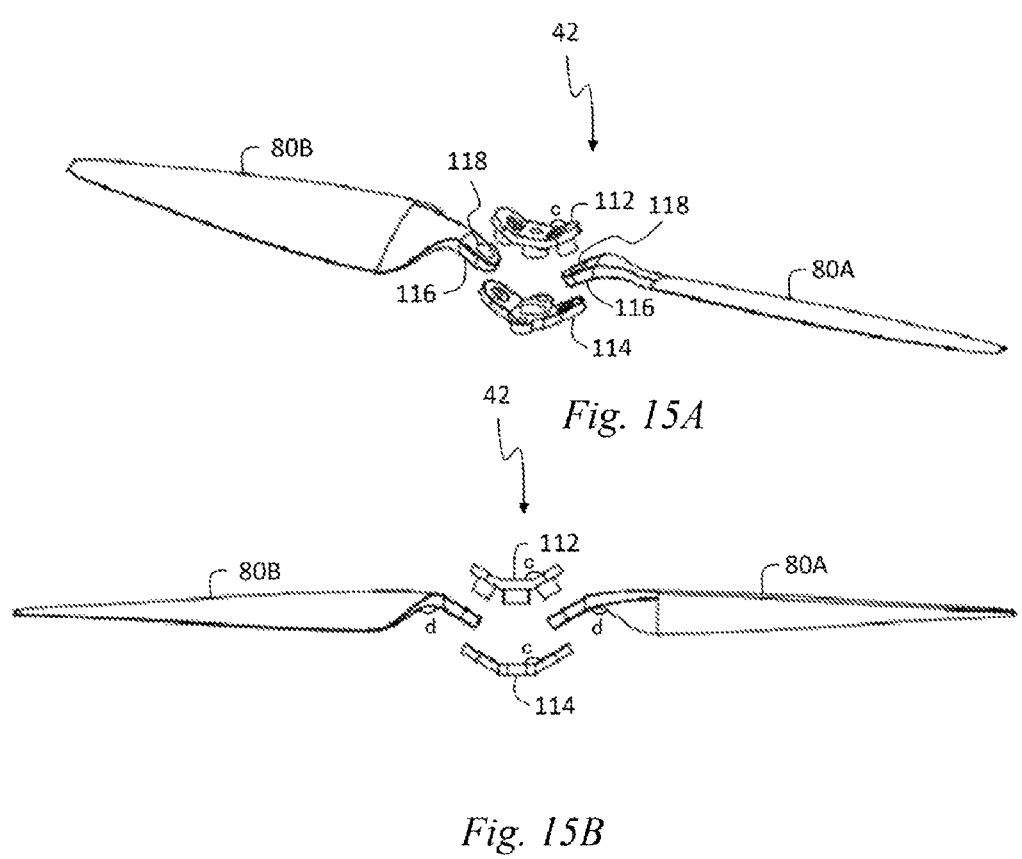
FIG. 15A is an exploded perspective view of a rotor assembly of an unmanned flight system according to a preferred embodiment of the present disclosure.
FIG. 15B is an exploded front view of a rotor assembly of an unmanned flight system according to a preferred embodiment of the present disclosure.

The specific structure of the rotor assembly 42 is shown in FIGS. 15A and 15B. In this preferred embodiment, the blade mounting assembly includes a mounting member 112 and a mounting seat 114 that are fixedly connected to each other. Herein, the first blade 80A and the second blade 80B are respectively provided with a blade mounting hole 118 (i.e., a first blade mounting hole and a second blade mounting hole) near an end of the blade mounting assembly. A first mounting post for passing through the first blade mounting hole and a second mounting post for passing through the second blade mounting hole are provided at the bottom of the mounting member 112, such that the first blades and second blades are pivotably connected to the blade mounting assembly. The mounting seat 114 may be fixed to the mounting member 112 through, for example, a threaded connection, or any other connection way may be considered, so that the mounting seat 114 is fixedly connected to the mounting member 112 without affecting the pivoting of the blades. In this way, the blade 80A, 80B is held in place but can rotate about the respective post.

Figure 17:
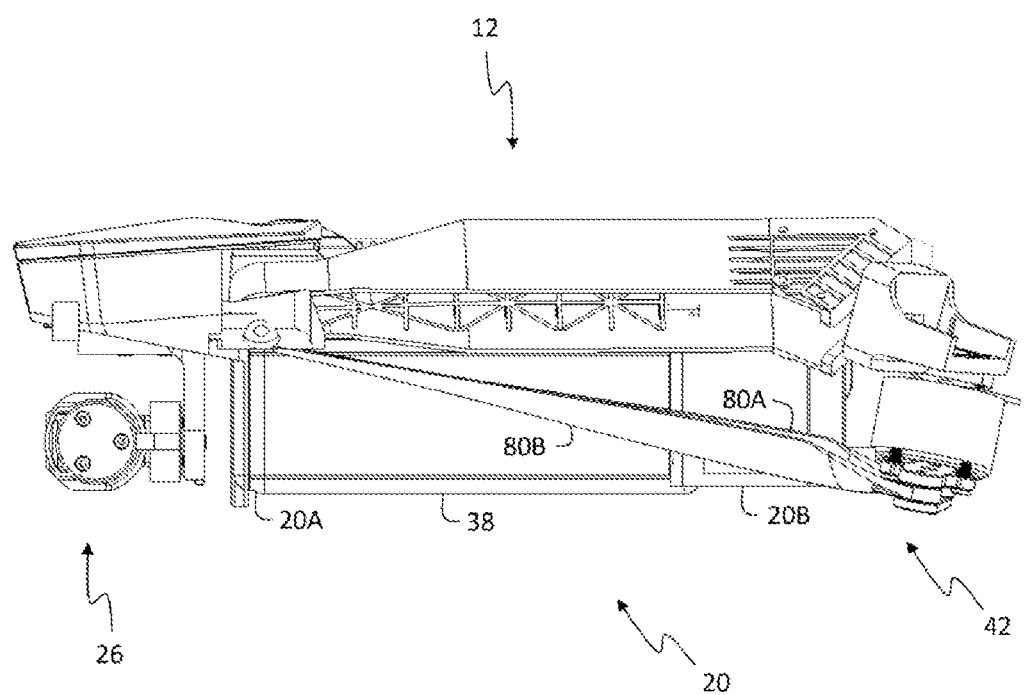
FIG. 17 is a front view of an unmanned flight system in a second folded state according to a preferred embodiment of the present disclosure.
Figure 18:
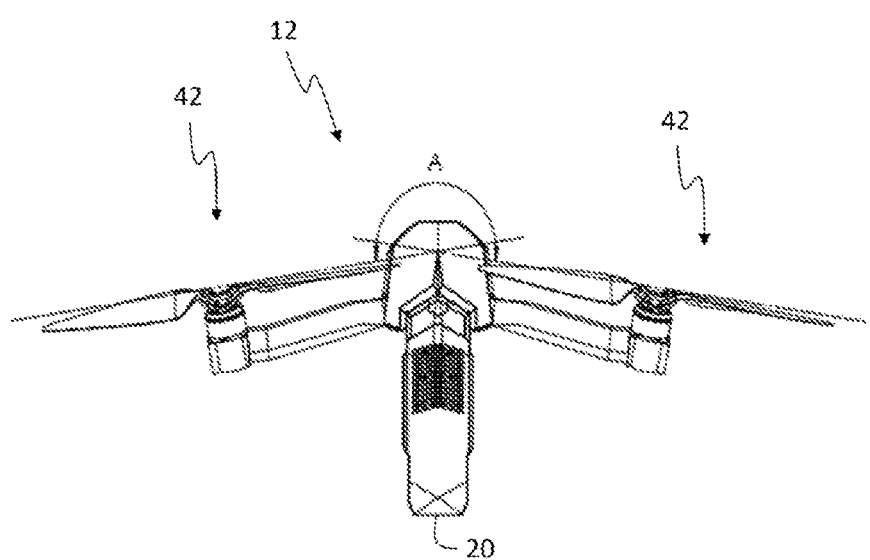
FIG. 18 is a top view of an unmanned flight system in a forward flight position according to a preferred embodiment of the present disclosure.

A root or end of the blade 80A, 80B is kept parallel to mounting surfaces of the mounting member 112 and the mounting seat 114. Mounting surfaces of the wings are at predetermined angles relative to the horizontal plane. In this preferred implementation, the mounting member 112 includes a first end segment provided with the first mounting post, a second end segment provided with the second mounting post, and an intermediate segment. Accordingly, the mounting seat 114 includes a first end containing segment containing the first mounting post, a second end containing segment containing the second mounting post, and an intermediate containing segment. The first and second end segments are at an angle c (for example, any angle in the range of 0 to 180°, and preferably any angle in the range of 90° to) 180° to the intermediate segment and are symmetrically (asymmetrically may also be considered) provided on two sides of the intermediate segment, and the first and second end containing segments are at an angle to the intermediate containing segment and are symmetrically provided on two sides of the intermediate containing segment. Correspondingly, the ends of the first blade 80A and the second blade 80B near the blade mounting assembly are configured to be at an inclined angle d to a blade reference plane, where the angle d may be, for example, any angle in the range of 0 to 180°, and preferably any angle in the range of 90° to 180°. Herein, through the cooperation of the angle c and the angle d, the first blade 80A and the second blade 80B can be oriented in the same direction as much as possible in their "blade-folded positions", so that the first blade 80A and the second blade 80B are folded up in such a way that they overlap as much as possible. For example, the angle c and the angle d may be equal and both are 135°. When the blade 80A, 80B is rotated by 90° or more, the entire blade 80A, 80B is lower than the mounting surface of the blade 80A, 80B, and the blade is close to the arm 72 when folded (as shown in FIGS. 17 and 18). This is beneficial to the overall space saving of the unmanned flight system 12 and minimizes the storage volume when the unmanned flight system 12 is not used.

In this preferred embodiment, during the flight, the rotation of the motor 82 drives the corresponding rotor assembly 42. Under the action of centrifugal force, the folded blades 80A, 80B can be automatically unfolded. The unmanned flight system 12 may be operated to rise vertically by the lift power. The servo motor 88 and the gearbox 90 drive or rotate the respective motor base 84 to realize the tilting of the rotor plane. When the two rotor assemblies 42 are tilted forward of the fuselage 20, the unmanned flight system 12 will pitch to achieve forward flight. Similarly, the unmanned flight system 12 may achieve backward flight when the two rotor assemblies 42 are tilted backward of the body 20.

When one of the two rotor assemblies 42 is tilted forward and the other is tilted backward, the unmanned flight system 12 rotates in a yaw direction. When the two rotor assemblies 42 are kept parallel to the ground plane, the unmanned flight system will hover. The unmanned flight system 12 may roll by generating a difference in lift and spinning speed difference between the two rotor assemblies. When the mounting plane of the motor base is parallel to the ground plane, the steering gear is at the zero position, and the motor base can rotate in the range of ±90°, e.g., 50°.

Figure 19:
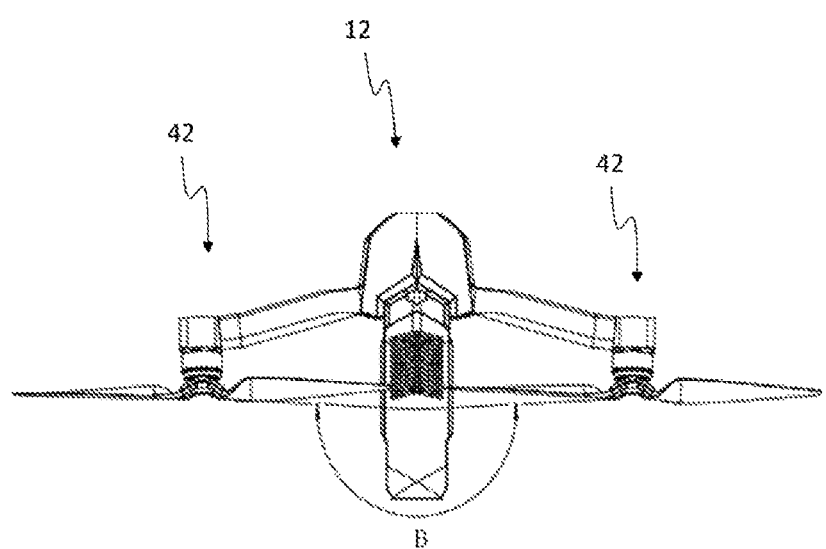
FIG. 19 is a top view of an unmanned flight system in a backward flight position according to a preferred embodiment of the present disclosure.

When the unmanned flight system is in a forward flight state, the two rotor assemblies 42 are tilted toward the front of the fuselage, at a desired angle A, which is generally greater than 180°, as shown in FIG. 18. Similarly, as shown in FIG. 19, in a backward flight state, the two rotor assemblies 42 are tilted toward the rear of the fuselage. Therefore, the two rotors are at a desired angle B, which is generally greater than 180°. Angle A and angle B may be the same or different.

Figure 16:
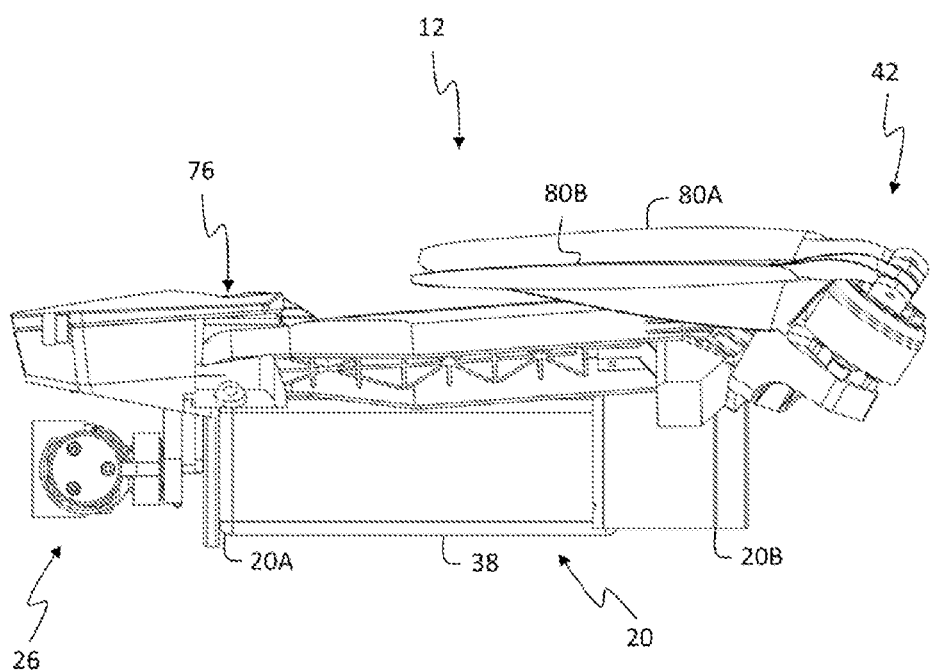
FIG. 16 is a front view of an unmanned flight system in a first folded state according to a preferred embodiment of the present disclosure.

The unmanned flight system 12 may be placed in a compact storage state as shown in FIGS. 16 and 17. First, as shown in FIG. 16, the rotor structures 70A, 70B may be rotated about respective hinge mechanisms 78 to place the respective arms 72 close to the body 20. Then the rotor assembly 42, including the motor 82 and the motor base 84, may be rotated about the respective arm 72 into a downward position, as shown in FIG. 17. In a given embodiment or design, the rotor structures may be placed in an upward and/or a downward position. In other words, the given embodiment or design may allow the rotor structures 70A, 70B to be placed in an upward position only, a downward position only, or both upward and downward folded positions.

According to a preferred embodiment of the present disclosure, the unmanned flight system 12 may further include an actuation mechanism 28 (not shown) for operatively mounting an optical system 26 (described in detail below with reference to FIGS. 3 and 4) to the body 20. Additionally, the actuation mechanism 28 can also function to dampen the vibration of an optical sensor (e.g., mechanically stabilize the resultant image), accommodate for the rolling of the unmanned flight system, or perform any other suitable function. The actuation mechanism 28 may be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body 20, translate the optical system 26 along one or more axes relative to the body, or otherwise actuate the optical system 26. The optical sensor (s) 36 can be mounted to a support along a first end, along the back (e.g., opposing the active surface) of the optical sensor, through the body of the optical sensor, or along any other suitable portion of the optical sensor 36.

In one variation, the actuation mechanism 28 may include a motor (not shown) connected to a single pivotal support (e.g., gimbal), wherein the motor pivots the support about the rotational (or gimbal) axis based on instructions received from the controller. The support is preferably arranged with the rotational axis being substantially parallel to the lateral axis of the body 20, but can alternatively be arranged with the rotational axis being at any other suitable orientation relative to the body 20. The support is preferably arranged within a recessed cavity defined by the body 20, wherein the recessed cavity further encompasses the optical sensor 36, but the optical sensor 36 can alternatively be arranged along the exterior of the body or arranged at any other suitable portion of the body 20. The optical sensor 36 is preferably mounted to the support with the active surface being substantially parallel to the rotational axis (e.g., with the lateral axis, or an axis parallel to the lateral axis of the body 20, being substantially parallel to the rotational axis), but can alternatively be arranged with the active surface being arranged at any suitable angle to the rotational axis. The illustrated electric machine is preferably a motor, but can alternatively be any other suitable electric machine. Examples of electric motors that can be used include: a DC motor (e.g., brushed motor), an EC motor (e.g., a brushless motor), an induction motor, a synchronous motor, an magnetic motor, or any other suitable electric motor. The motor is preferably mounted to the body 20 (e.g., the interior of the body), electrically connected to the processing system 22 and controlled by the processing system 22, and electrically connected to a power source 38 or system and powered by the power source 38 or system. However, the motor can be otherwise connected. The actuation mechanism 28 preferably includes a single motor-support set, but can alternatively include a plurality of motor-support sets, wherein auxiliary motor-support sets may be arranged orthogonal (or at any other suitable angle) to the first motor-support set.

In a second variation, the actuation mechanism 28 may include a set of pivotal supports and weights connected to the optical sensor 36, the weights being offset from the center of gravity of the optical sensor, wherein the actuation mechanism 28 can passively stabilize the optical sensor 36.

3. Electrical System of the Unmanned Flight System

The electrical system of the unmanned flight system 12 according to a preferred embodiment of the present disclosure will be described below with reference to FIGS. 3 to 6. As shown in FIGS. 3 to 6, the unmanned flight system 12 (e.g., unmanned flight system) may include a processing system 22, a communication system 24, an optical system 26 (including sensors 36, 44), a power source 38, an obstacle detection and avoidance unit 50, etc. The unmanned flight system 12 may additionally or alternatively include a lift mechanism, a sensor, a power system, or any other suitable component (see below).

The processing system 22 of the unmanned flight system 12 functions to control the operation of the unmanned flight system. The processing system 22 can: receive operation instructions from the communication system 24, interpret the operation instructions into machine instructions, and control the components of the unmanned flight system based on the machine instructions (individually or as a set). The processing system 22 may additionally or alternatively process images recorded by the camera, transmit the images to the system controller 14 (e.g., in real- or near-real time), or perform any other suitable function. The processing system 22 may include one or more of: a processor 32 (e.g., CPU, GPU, etc.), a memory (e.g., Flash, RAM, etc.), or any other suitable processing component. In one variation, the processing system 22 may further include dedicated hardware that automatically processes the images (e.g., de-warps the images, filters the images, crops the images, etc.) prior to transmission to the system controller 14. The processing system 22 is preferably connected to the active components of the unmanned flight system 12 and mounted to the body 20, but can alternatively be otherwise related to the components of the unmanned flight system.

The processing system 22 can perform the method; stabilize the unmanned flight system 12 during flight (e.g., selectively operate the rotors to minimize the wobbling of the unmanned flight system when in flight); receive, interpret, and operate the unmanned flight system 12 based on remote control instructions; or otherwise control the operation of the unmanned flight system. The processing system 22 is preferably configured to receive and interpret measurements sampled by the sensors 36, 44, more preferably by combining measurements sampled by disparate sensors (e.g., combining data from a camera and an accelerometer). The unmanned flight system 12 may include one or more processing systems, wherein different processors can perform the same function (e.g., function as a multi-core system), or perform dedicated functions. The processing system 22 is preferably mounted to the body 20, but can alternatively be mounted to any other suitable component. The processing system 22 is preferably powered by the power source 38, but can be otherwise powered. The processing system 22 is preferably connected to the sensors 36, 44, the communication system 24 and the lift mechanism 40, and controls the sensors 36, 44, the communication system 24 and the lift mechanism 40, but may additionally or alternatively be connected to and interact with any other suitable component.

The communication system 24 of the unmanned flight system 12 functions to send and/or receive information from the system controller 14, and/or communicate with one or more remote computing systems. The communication system 24 is preferably connected to the processing system 22, such that the communication system 24 sends data to the processing system 22 and/or receives data form the processing system 22, but can alternatively be connected to any other suitable component. The unmanned flight system 12 may include one or more communication systems 24 of one or more types. The communication system 24 may include a wireless connection device, such as a radio supporting system: a long-range system (e.g., Wi-Fi, cellular, WLAN, WiMAX, microwave, IR, radio frequency, etc.), a short-range system (e.g., BLE, BLE long range, NFC, ZigBee, RF, audio, optical, etc.), or any other suitable communication system 24. The communication system 24 preferably shares at least one system protocol (e.g., BLE, RF, etc.) with the system controller 14, but can alternatively communicate with the system controller 14 via an intermediary communication system (e.g., a protocol conversion system). Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is preferably powered by the power source 38, but can be otherwise powered. The communication system 24 is preferably connected to the processing system 22, but may additionally or alternatively be connected to and interact with any other suitable assembly. However, the communication system 24 can be otherwise configured.

The optical system 26 of the unmanned flight system 12 functions to record images of the physical space near the unmanned flight system 12. The optical system 26 is preferably mounted to the body 20 via the actuation mechanism 28, but can alternatively be statically mounted to the body 20. The optical system 26 is removably mounted to the body 20, or otherwise mounted to the body 20. The optical system 26 is preferably mounted to the front end of the body 20, but can optionally be mounted to the bottom (e.g., near the front), top, back end of the body 20, or any other suitable portion of the body 20. The optical system 26 is preferably connected to the processing system 22, but can alternatively be connected to the communication system 24 or to any other suitable system. The optical system 26 may further include dedicated image processing hardware that automatically processes images recorded by the camera prior to transmission to the processor or other endpoint. The unmanned flight system 12 may include one or more optical systems 26 of same or different type(s). The optical systems 26 are mounted to the same or different position(s). In one variation, the unmanned flight system 12 includes a first optical system 26 mounted to the front end of the body 20, and a second optical system 26 mounted to the bottom of the body 20. The first optical system 26 can be actuated about a pivotal support, and the second optical system 26 can be substantially statically retained relative to the body 20, with the respective active surface being substantially parallel to the body bottom. The first optical sensor 36 may be high-definition, while the second optical sensor 36 may be low-definition. However, the optical system 26 can be otherwise configured.

Figure 5:
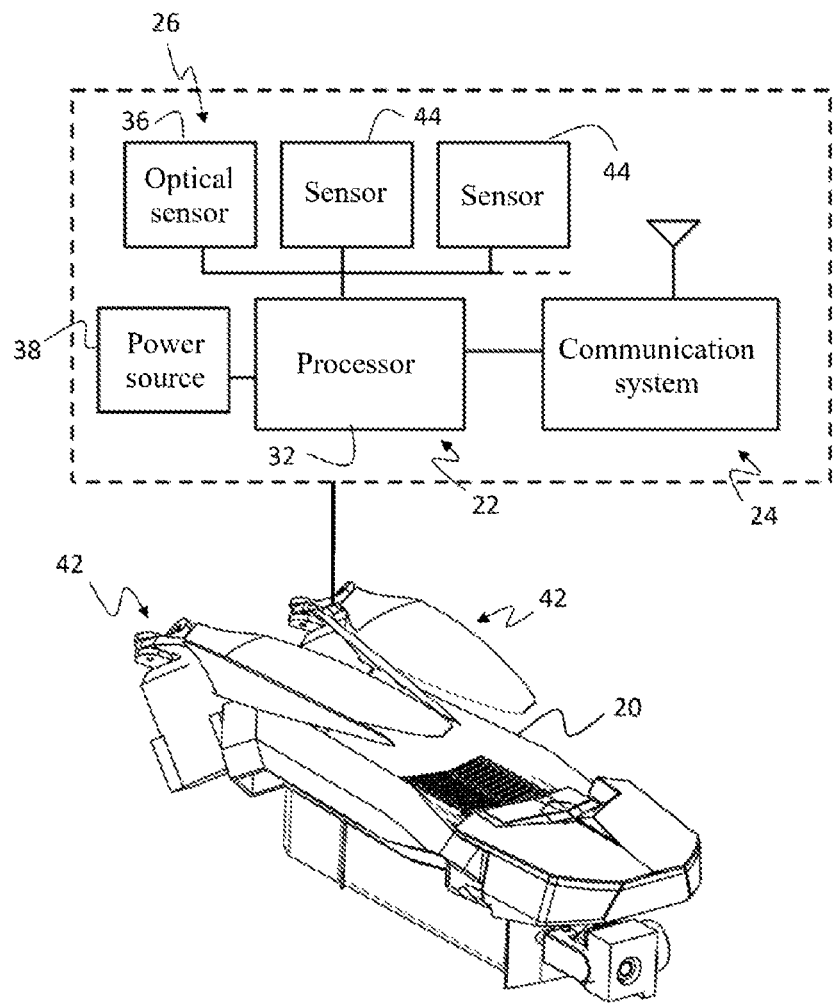
FIG. 5 is a control block diagram of an unmanned flight system according to a preferred embodiment of the present disclosure.

The optical system 26 may include one or more optical sensors 36 (see FIG. 5). The one or more optical sensors 36 may include: a single-lens camera (e.g., a CCD camera, a CMOS camera, etc.), a stereo-camera, a hyperspectral camera, a multispectral camera, or any other suitable image sensor. However, the optical system 26 may be any other suitable optical system 26. The optical system 26 can define one or more active surfaces that receive light, but can alternatively include any other suitable component. For example, an active surface of a camera may be an active surface of a camera sensor that preferably includes a regular array of sensor pixels. The camera sensor or other active surface is preferably substantially planar and rectangular (e.g., having a first sensor edge, a second sensor edge opposing the first sensor edge, and third and fourth sensor edges perpendicular to the first sensor edge and extending from the first sensor edge to the second sensor edge), but can alternatively have any suitable shape and/or topography. The optical sensor 36 can produce an image frame. The image frame preferably corresponds to the shape of the active surface (e.g., rectangular, having a first and a second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 may optionally include a zoom lens, digital zoom, a fisheye lens, a filter, or any other suitable active or passive optical adjustment. Application of the optical adjustment can be actively controlled by the controller, manually controlled by the user 18 (e.g., wherein the user manually sets the adjustment), controlled by the system controller 14, or otherwise controlled. In one variation, the optical system 26 may include a housing enclosing the remainder of the components of the optical system, wherein the housing is mounted to the body 20. However, the optical system 26 can be otherwise configured.

In the optical system 26, at least one optical sensor 36 is configured for live video streaming and computer vision analysis. Optionally, the unmanned flight system 12 may have at least one depth sensor (or stereo-vision pair) for multi-pixel depth sensing. Optionally, the unmanned flight system 12 may have at least one on-board microphone for speech recognition and control.

In general, in order to provide full control of the unmanned flight system 12, a plurality of user/unmanned flight system interactions or activities from start to end of an aerial session are provided. The user/unmanned flight system interactions, include, but are not limited to take-off and landing, owner recognition gesture recognition, facial expression recognition, and speech control.

The sensors 36, 44 of the optical system 26 function to acquire signals indicative of the ambient environment of the unmanned flight system and/or the operation of the unmanned flight system, signals indicative of the ambient environment surrounding the unmanned flight system 12 (e.g., the physical space near the unmanned flight system 12), or any other suitable parameter. The sensors 36, 44 are preferably mounted to the body 20 and controlled by the processing system 22, but can alternatively be mounted to any other suitable component and/or otherwise controlled. The sensors 36, 44 are preferably powered by the power source 38 and controlled by the processor, but can be connected to and interact with any other suitable component. The sensors 36, 44 may include one or more of: a camera (e.g., CCD, CMOS, multispectral, visual range, hyperspectral, stereoscopic, etc.), an orientation sensor (e.g., an inertial measurement sensor, an accelerometer, a gyroscope, an altimeter, a magnetometer, etc.), an audio sensor (e.g., a transducer, a microphone, etc.), a barometer, a light sensor, a temperature sensor, a current sensor (e.g., a Hall effect sensor), an air flow meter, a voltmeter, a touch sensor (e.g., resistive, capacitive, etc.), a proximity sensor, a force sensor (e.g., a strain gauge meter, a load cell), a vibration sensor, a chemical sensor, a sonar sensor, a position sensor (e.g., GPS, GNSS, triangulation, etc.), or any other suitable sensor. In one variation, the unmanned flight system 12 includes: a first camera mounted (e.g., statically or rotatably) along a first end of the body of the unmanned flight system, with a field of view intersecting the lateral plane of the body; a second camera mounted along the bottom of the body of the unmanned flight system, with a field of view being substantially parallel to the lateral plane; and a set of orientation sensors, such as an altimeter and an accelerometer. The unmanned flight system 12 may include one or more sensors 36, 44 or any suitable number of sensors of any type.

The power source 38 of the unmanned flight system 12 functions to power the active components (e.g., the motor of the lift mechanism, etc.) of the unmanned flight system 12. The power source 38 is preferably mounted to the body 20, and electrically connected to all the active components of the unmanned flight system 12 (e.g., directly or indirectly), but can be otherwise arranged. The power source 38 may be a primary battery, a secondary battery (e.g., a rechargeable battery), a fuel cell, an energy harvester (e.g., solar, wind, etc.), or any other suitable power source. Examples of secondary batteries that can be used include: lithium chemistry (e.g., lithium ion, lithium ion polymer, etc.), nickel chemistry (e.g., NiCad, NiMH, etc.), or a battery with any other suitable chemistry. The power source 38 may be mounted to the body 20 and connected to the active components, or be otherwise arranged. The power source 38 may be a rechargeable battery, a secondary battery, a primary battery, a fuel cell, or any other suitable power source.

Figure 6:
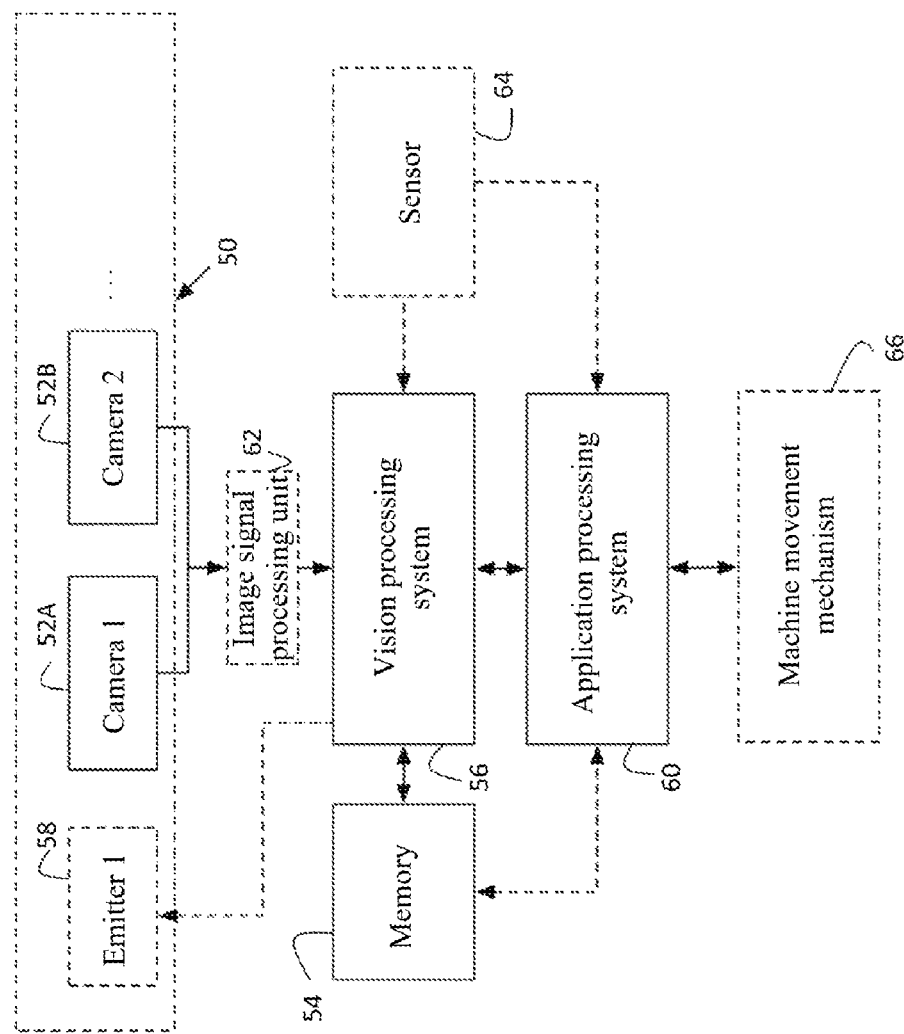
FIG. 6 is a block diagram of an unmanned flight system including an obstacle detection and avoidance system according to a preferred embodiment of the present disclosure.

Referring to FIG. 6, in a preferred embodiment of the present disclosure, the unmanned flight system 12 may include an obstacle detection and avoidance system 50. In one embodiment, the obstacle detection and avoidance system 50 may include a pair of ultra-wide-angle lens cameras 52A, 52B. The pair of ultra-wide-angle lens cameras 52A, 52B may be, for example, equipped coaxially at the center top and center bottom of the fuselage, such that the images recorded by the cameras can be processed on-board, in realor near-real time. This allows a robot to navigate using the images recorded by the cameras.

The pair of cameras 52A, 52B are generally mounted or statically fixed to a housing of the body 20. A memory 54 and a vision processor 56 are connected to the pair of cameras 52A, 52B. The system functions to sample images of a monitored region for real- or near-real time image processing, such as depth analysis. The system may additionally or alternatively generate 3D video, generate a map of the monitored region, or perform any other suitable function.

The housing functions to retain the pair of cameras 52A, 52B in a predetermined configuration. The system preferably includes a single housing that retains the pair of cameras 52A, 52B, but can alternatively include multiple housing pieces or any other suitable number of housing pieces.

The pair of cameras 52A, 52B may function to sample signals of the ambient environment surrounding the unmanned flight system 12. The pair of cameras 52A, 52B are arranged with the respective view cone of each camera overlapping a view cone of the other camera (see below).

Each camera 52A, 52B may be a CCD camera, a CMOS camera, or any other suitable type of camera. The camera may be sensitive in the visible light spectrum, IR spectrum, or any other suitable spectrum. The camera may be hyperspectral, multispectral, or capture any suitable subset of bands. The cameras may have a fixed focal length, an adjustable focal length, or any other suitable focal length. However, the camera can have any other suitable set of parameter values. The multiple cameras may be identical or different.

Each camera 52A, 52B is preferably associated with a known location relative to a reference point (e.g., on the housing, a camera of the multiple cameras, on the host robot, etc.), but can be associated with an estimated, calculated, or unknown location. The pair of cameras 52A, 52B are preferably statically mounted to the housing (e.g., throughholes in the housing), but can alternatively be actuatably mounted to the housing (e.g., via a joint). The cameras may be mounted to faces, edges, vertexes of the housing, or to any other suitable housing feature. The cameras may be aligned with, centered along, or otherwise arranged relative to the housing feature. The camera may be arranged to have an active surface perpendicular to a housing radius or surface tangent, an active surface parallel to a housing face, or be otherwise arranged. Adjacent active surfaces of the cameras may be parallel to each other, at a non-zero angle to each other, lie on the same plane, be angled relative to a reference plane, or otherwise arranged. Adjacent cameras preferably have a baseline (e.g., inter-camera or axial distance, distance between the respective lenses, etc.) of 6.35 cm, but can be further apart or closer together.

The cameras 52A, 52B may be connected to the same visual processing system and memory, but can be connected to disparate visual processing systems and/or memories. The cameras are preferably sampled on the same clock, but can be connected to different clocks (e.g., wherein the clocks may be synchronized or otherwise related). The cameras are preferably controlled by the same processing system, but can be controlled by different processing systems. The cameras are preferably powered by the same power source (e.g., rechargeable battery, solar panel array, etc.; host robot power source, separate power source, etc.), but can be powered by different power sources or otherwise powered.

The obstacle detection and avoidance system 50 may also include an emitter 58. The emitter 58 functions to illuminate a physical region monitored by the cameras 52A, 52B. The obstacle detection and avoidance system 50 may include one emitter 58 for one or more of the cameras 52A, 52B, multiple emitters 58 for one or more of the cameras 52A, 52B, or multiple emitters 58 or any suitable number of emitters 58 in any other suitable configuration. The emitter (s) 58 may emit modulated light, structured light (e.g., having a known pattern), collimated light, diffuse light, or light having any other suitable property. The emitted light may include wavelengths in the visible range, UV range, IR range, or in any other suitable range. The position of the emitter (e.g., relative to a given camera) is preferably known, but can alternatively be estimated, calculated, or otherwise determined.

In a second variation, the obstacle detection and avoidance system 50 operates as a non-contact active 3D scanner. The non-contact system is a time of flight sensor, including a camera and an emitter, wherein the camera records reflections (of the signal emitted by the emitter) off an obstacle in the monitored region and determines the distance between the system 50 and the obstacle based on the reflected signal. The camera and the emitter are preferably mounted within a predetermined distance of each other (e.g., several millimeters), but can be otherwise mounted. The emitted light may be diffuse, structured, modulated, or have any other suitable parameter. In a second variation, the non-contact system is a triangulation system, which also includes a camera and an emitter. The emitter is preferably mounted beyond a threshold distance of the camera (e.g., beyond several millimeters of the camera) and orientated at a non-parallel angle to an active surface of the camera (e.g., mounted to a vertex of the housing), but can be otherwise mounted. The emitted light may be collimated, modulated, or have any other suitable parameter. However, the system 50 can define any other suitable non-contact active system. However, the pair of cameras can form any other suitable optical range finding system.

The memory 54 of the obstacle detection and avoidance system 50 functions to store camera measurements. The memory may additionally function to store settings; maps (e.g., calibration maps, pixel maps); camera positions or indexes; emitter positions or indexes; or any other suitable set of information. The system may include one or more memories. The memory is preferably nonvolatile (e.g., flash, SSD, eMMC, etc.), but can alternatively be volatile (e.g. RAM). In one variation, the cameras 52A, 52B write to the same buffer, wherein each camera is assigned to a different portion of the buffer. In a second variation, the cameras 52A, 52B write to different buffers in the same or different memory. However, the cameras 52A, 52B can write to any other suitable memory. The memory 54 is preferably accessible by all the processing systems (e.g., a vision processor, an application processor) of the system, but can alternatively be accessible by a subset of the processing systems (e.g., a single vision processor, etc.).

The vision processing system 56 of the obstacle detection and avoidance system 50 functions to determine the distance of a physical point from the system. The vision processing system preferably determines the pixel depth of each pixel from a subset of pixels, but may additionally or alternatively determine the object depth or determine any other suitable parameter of a physical point or collection thereof (e.g., object). The vision processing system 56 preferably processes the sensor stream from the cameras 52A, 52B. The vision processing system 56 may process each sensor stream at a predetermined frequency (e.g., 30 FPS), but can process the sensor streams at a variable frequency or at any other suitable frequency. The predetermined frequency can be received from an application processing system 60, retrieved from a memory, automatically determined based on a camera score or classification (e.g., front, side, back, etc.), determined based on available computing resources (e.g., magnetic cores available, battery level remaining, etc.), or otherwise determined. In one variation, the vision processing system 56 processes multiple sensor streams at the same frequency. In a second variation, the vision processing system 56 processes multiple sensor streams at different frequencies, wherein the frequencies are determined based on the classification assigned to each sensor stream (and/or source camera), wherein the classification is assigned based on the orientation of the source camera relative to the host robot's travel vector.

The application processing system 60 of the obstacle detection and avoidance system 50 may include one or more application processors. The application processor may be a CPU, a GPU, a microprocessor, or any other suitable processing system. The application processing system 60 may additionally or alternatively perform object detection, classification, tracking (e.g., optical flow), or any other suitable process using the sensor streams. The application processing system may additionally or alternatively generate control instructions based on the sensor streams (e.g., based on the output from the vision processor). For example, navigation (e.g., using SLAM, RRT, etc.) or visual odometry processes can be performed using the sensor streams, wherein the system and/or host robot is controlled based on the navigation outputs. The application processing system 60 may additionally or alternatively receive control commands and operate the unmanned flight system 12 and/or the host robot based on the commands. The application processing system 60 may additionally or alternatively receive external sensor information and selectively operate the system and/or the host robot based on the commands. The application processing system 60 may additionally or alternatively determine robotic system kinematics (e.g., position, direction, velocity, and acceleration) based on sensor measurements (e.g., using sensor fusion). In one example, the application processing system 60 can use measurements from an accelerometer and a gyroscope to determine the traversal vector of the system and/or the host robot (e.g., direction of travel of the system). The application processing system 60 may optionally automatically generate control instructions based on the robotic system kinematics. For example, the application processing system 60 can determine the position of the system (in a physical volume) based on images from the cameras 52A, 52B, wherein the relative position (from the orientation sensors) and actual position and speed (determined from the images) can be fed into a flight control module. In this example, images from a downward-facing camera subset can be used to determine system conversion (e.g., using optical flow), wherein the system conversion can be further fed into the flight control module. In a specific example, the flight control module can synthesize these signals to maintain the position of the robot (e.g., hover an unmanned flight system). The application processing system 60 may be implemented as part of the vision processing system 56, or be separate from the vision processing system 56, or be different from the vision processing system 56. The application processing system 60 may be connected to the vision processing system 56 via one or more interface bridges. The interface bridge may be a high-throughput and/or bandwidth connection, and can use a MIPI protocol (e.g., 2-input to 1-output camera aggregator bridges—expands the number of cameras that can be connected to a vision processor), a LVDS protocol, a DisplayPort protocol, an HDMI protocol, or any other suitable protocol. Alternatively, or additionally, the interface bridge may be a low-throughput and/or bandwidth connection, and can use a SPI protocol, UART protocol, I2C protocol, SDIO protocol, or any other suitable protocol.

The obstacle detection and avoidance system 50 may optionally include an image signal processing unit (ISP) 62. The image signal processing unit (ISP) 62 functions to pre-process the camera signals (e.g., images) before passing to the vision processing system and/or the application processing system. The ISP 62 can process the signals from all the cameras, the signals from the camera subset, or signals from any other suitable source. The ISP 62 can auto-white balance, correct field shading, rectify lens distortion (e.g., de-warp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 may be a chip-on system with a multi-core processor architecture, be an ASIC, have an ARM architecture, be a part of the vision processing system, be a part of the application processing system, or be any other suitable processing system.

The obstacle detection and avoidance system 50 may optionally include sensors 64. The sensors 64 function to sample signals indicative of the operation of the system. The output from the sensors can be used to determine system kinematics, process the images (e.g., for use in image stabilization), or otherwise used. The sensors 64 may be peripheral devices of the vision processing system 56, of the application processing system 60, or of any other suitable processing system. The sensors 64 are preferably statically mounted to the housing but can alternatively be mounted to the host robot or to any other suitable system. The sensors 64 may include: orientation sensors (e.g., IMUs, gyroscopes, accelerometers, altimeters, magnetometers), acoustic sensors (e.g., microphones, transducers), optical sensors (e.g., cameras, ambient light sensors), touch sensors (e.g., force sensors, capacitive touch sensors, resistive touch sensors), position sensors (e.g., GPS systems, beacon systems, trilateration systems), or any other suitable set of sensors.

Furthermore, the obstacle detection and avoidance system 50 may optionally include an input device (e.g., a keyboard, a touchscreen, a microphone, etc.), an output device (e.g., a speaker, a lamp, a screen, a vibration mechanism, etc.), a communication system (e.g., a WiFi module, BLE, a cellular module, etc.), a power storage device (e.g., a battery), or any other suitable component.

The obstacle detection and avoidance system 50 is preferably used with a host robot that functions to traverse within a physical space. The host robot may additionally or alternatively receive remote control instructions and operate according to the remote control instructions. The host robot may additionally generate remote content or perform any other suitable function. The host robot may include one or more of: communication modules, power mechanisms, sensors, content generation mechanisms, processing systems, reset mechanisms, or any other suitable set of components. The host robot may be an unmanned flight system, a vehicle, a robot, a security camera, or any other remotely-controllable system. The power mechanism may include a drivetrain, rotors, jets, pedals, rotary joint, or any other suitable power mechanism. The application processing system is preferably a host robot processing system, but can alternatively be connected to the host robot processing system or be otherwise related. In a specific example, the host robot includes an unmanned flight system (e.g., unmanned flight system) with a WiFi module, a camera, and the application processing system. The system may be mounted to the top of the host robot (e.g., as determined based on a gravity vector during typical operation), the bottom of the host robot, the front of the host robot, centered within the host robot, or otherwise mounted to the host robot. The system may be integrally formed with the host robot, removably coupled to the host robot, or otherwise attached to the host robot. One or more systems can be used with one or more host robots.

The unmanned flight system 12 may also include an input device (e.g., a microphone, a camera, etc.), an output device (e.g., a display, a speaker, a light emitting element, etc.), or any other suitable component.

4. Flight Control Over Unmanned Flight System

Different flight modes of the unmanned flight system 212 according to a preferred embodiment of the present disclosure are described below with reference to FIGS. 20A to 20I. In the preferred embodiment, the unmanned flight system 212 includes a body 220. A battery (power source 238) is incorporated in the body 220, and forms a part of the body 220. The body 220 has a first end 220A and a second end 220B. A lift system 40 of the unmanned flight system 212 includes a first rotor assembly 242A and a second rotor assembly 242B. Each rotor assembly 242A, 242B includes a pair of propeller blades 280A, 280B.

Figure 20B:
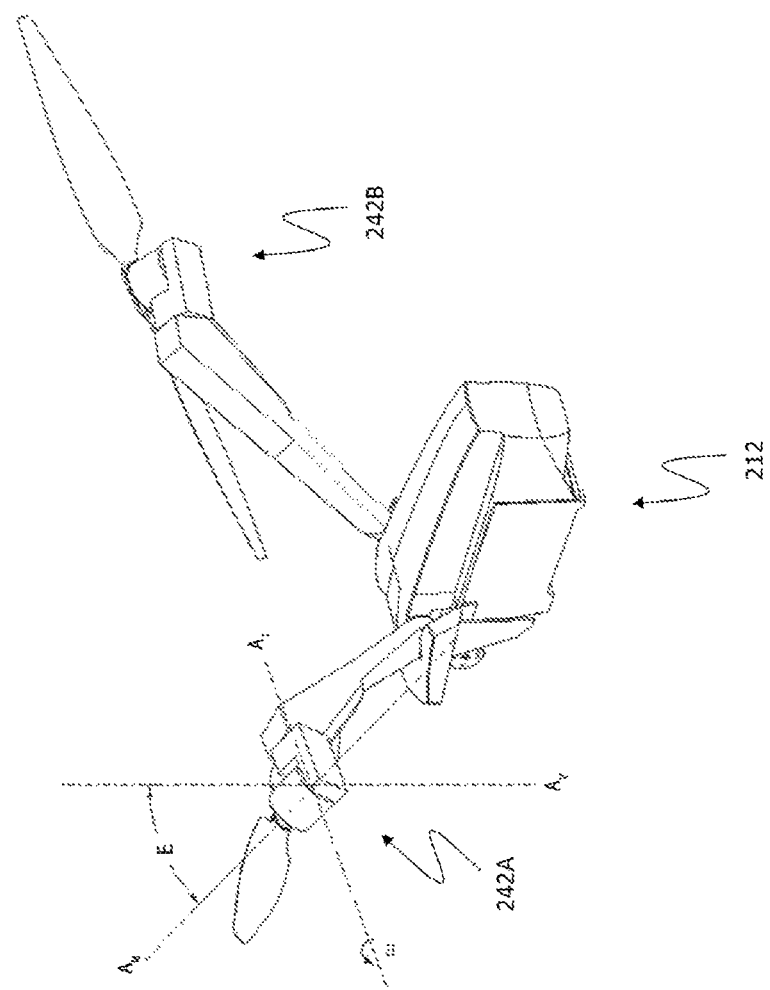
FIG. 20B is a schematic perspective view of an unmanned flight system in a forward flight position according to a preferred embodiment of the present disclosure.
Figure 20C:
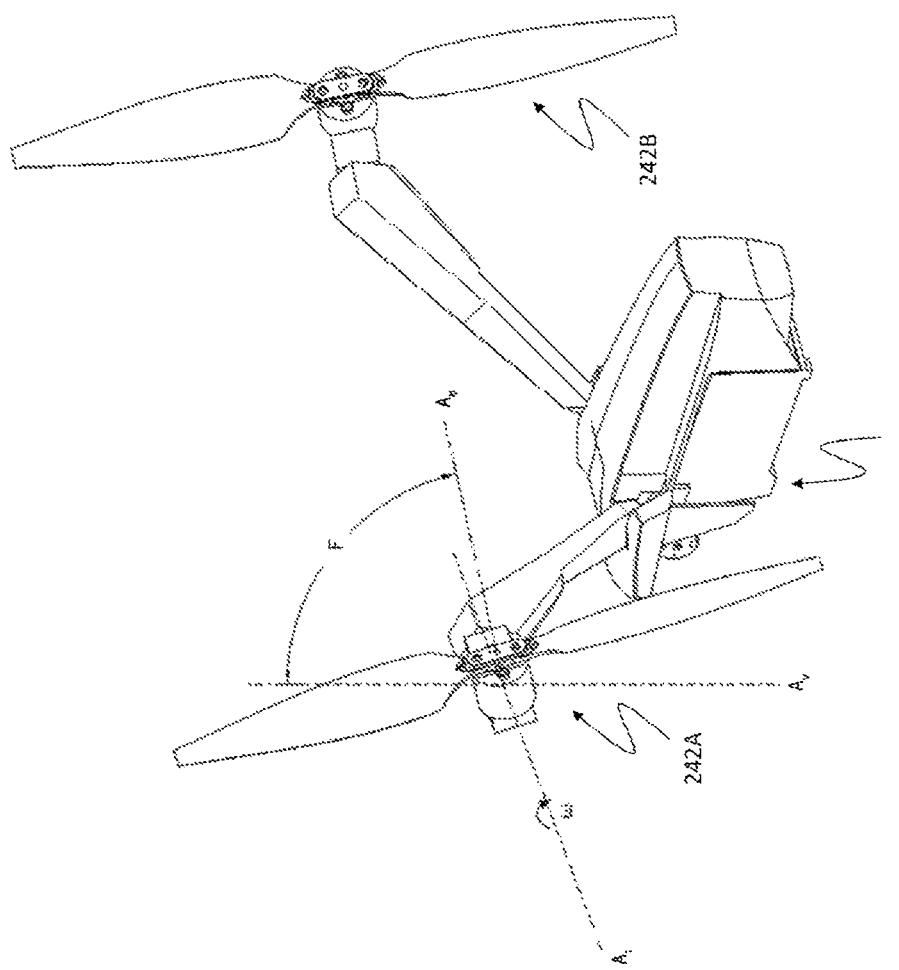
FIG. 20C is a schematic perspective view of an unmanned flight system in a backward flight position according to a preferred embodiment of the present disclosure.
Figure 20D:
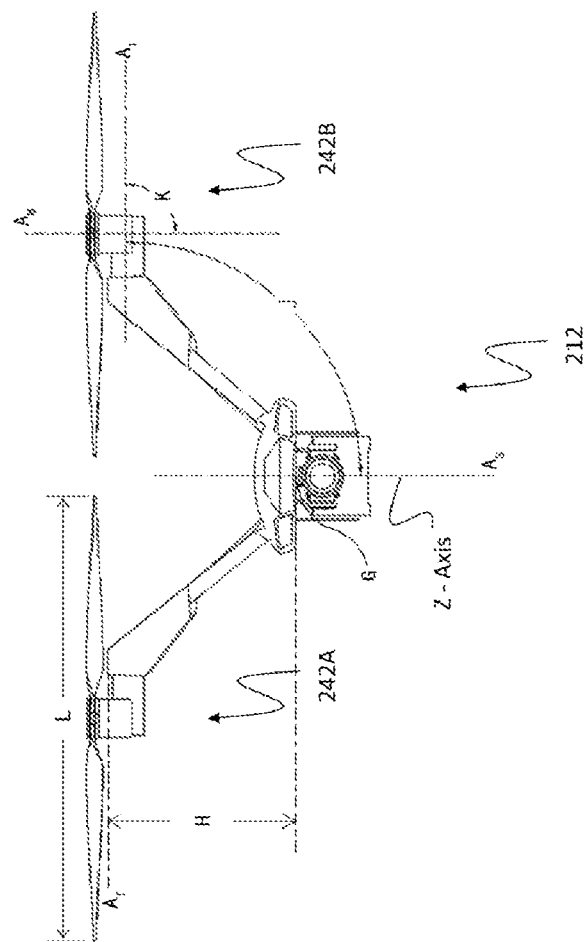
FIG. 20D is a schematic front view of an unmanned flight system in a hovering position according to a preferred embodiment of the present disclosure.

As can be seen from FIGS. 20A and 20D, the rotor assemblies 242A, 242B are controlled to be at a "hovering position" in which two motor axes (or rotor assembly axes) are parallel to each other and respectively parallel to a Z-axis, i.e. a vertical axis $A_V$ (see FIG. 20D), and the plane defined by the rotor assembly axes at the hovering position passes through the center of mass of the unmanned flight system 212 (as seen in FIG. 20A). In this case, the unmanned flight system 212 is hovering. As can be seen in FIG. 20A, an angle P between the rotational axis $A_T$ of the motor base and the rotational axis $A_M$ of the motor is in the range of 0 to 90°, such that the motor base can rotate in a relatively large range, and the flight of the system can be controlled more flexibly and effectively.

As can be seen from FIG. 20D, an angle J defined by the rotational axis $A_T$ of the motor base and the vertical axis $A_V$ (Z-axis) may be greater than or equal to (or less than or equal to) 90 degrees. An angle K defined by the rotational axis $A_T$ of the motor base and the motor axis $A_M$ may be greater than or equal to (or less than or equal to) 90 degrees. It should be noted that the height difference H between the rotational axis $A_T$ of the motor base and the center of gravity G of the unmanned flight system should be greater than or equal to zero.

As can be seen from FIG. 20B, the rotor assemblies 242A, 242B are controlled to be at a "forward flight position" in which the motor base (and therefore the rotor assemblies 242A, 242B) pivots towards the front end of the unmanned flight system 212 by a certain angle E. In this case, the unmanned flight system 212 moves forward or flies forward, and the angle E between the motor axis and the vertical axis is greater than or equal to zero.

As can be seen from FIG. 20C, the rotor assemblies 242A, 242B are controlled to be at a "backward flight position" in which the motor base (and therefore the rotor assemblies 242A, 242B) pivots towards the back end of the unmanned flight system 212 by a certain angle F. In this case, the unmanned flight system 212 moves backward or flies backward, and the angle F between the motor axis and the vertical axis is greater than or equal to zero.

The cooperation of the angle P, the angle J, the angle K, the angle E, and the angle F can achieve the flight stability of the unmanned flight system 212.

Figure 20E:
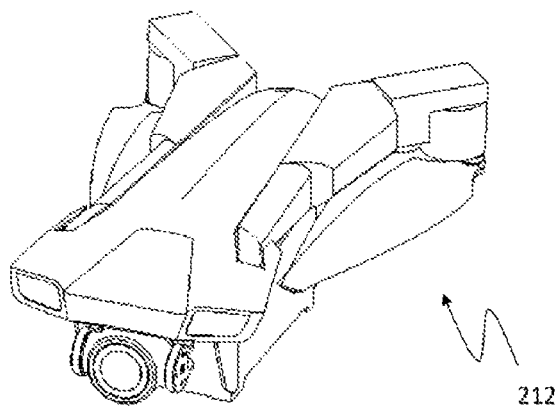
FIG. 20E is a schematic perspective view of an unmanned flight system in a folded state according to a preferred embodiment of the present disclosure.
Figure 20F:
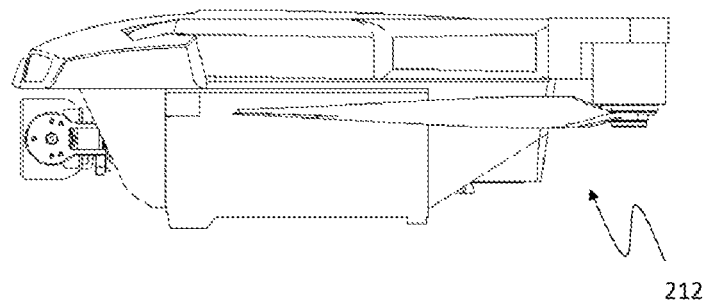
FIG. 20F is a schematic front view of an unmanned flight system in a folded state according to a preferred embodiment of the present disclosure.
Figure 20G:
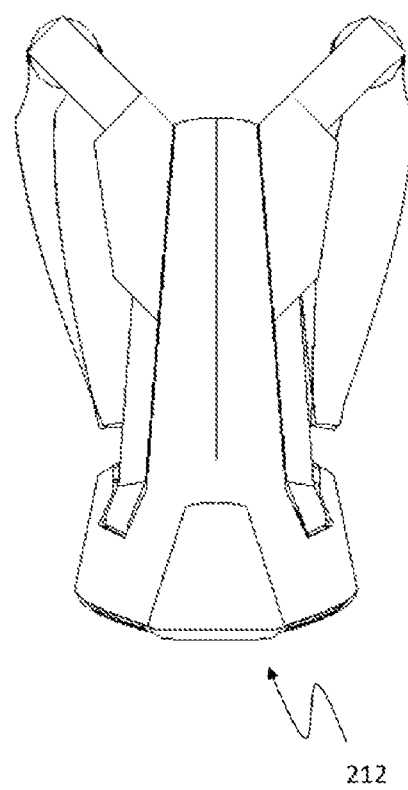
FIG. 20G is a schematic top view of an unmanned flight system in a folded state according to a preferred embodiment of the present disclosure.
Figure 20H:
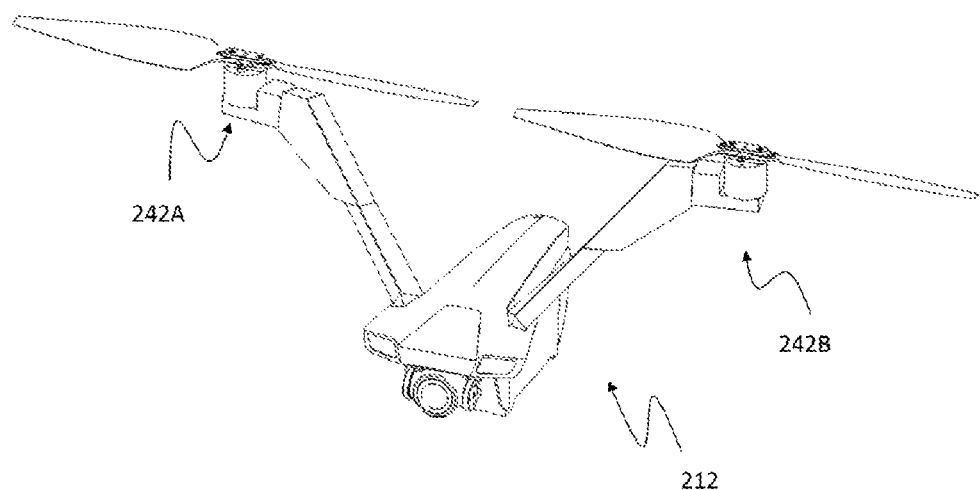
FIG. 20H is a schematic perspective view of an unmanned flight system in an unfolded state according to a preferred embodiment of the present disclosure.
Figure 20I:
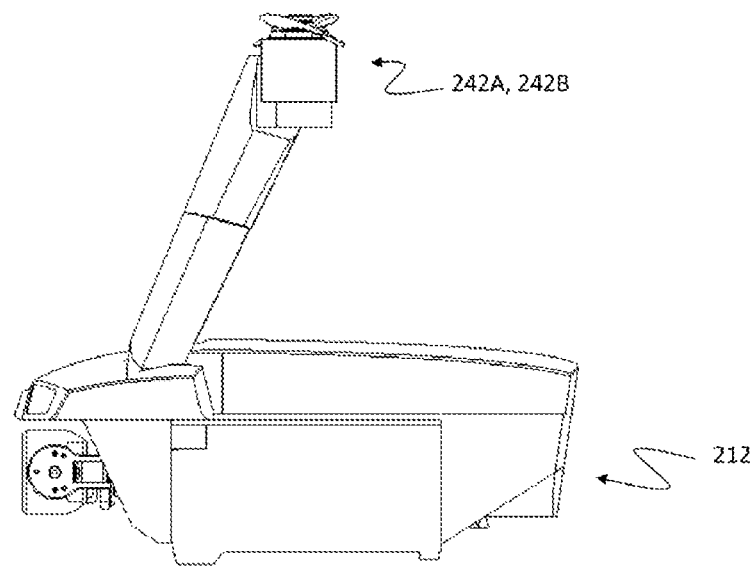
FIG. 20I is a schematic front view of an unmanned flight system in an unfolded state according to a preferred embodiment of the present disclosure.

An unmanned flight system 212 in a folded state is shown in FIGS. 20E to 20G. The unmanned flight system 212 in an unfolded state is shown in FIGS. 20H and 20I.

Although omitted for brevity, the preferred embodiments include each combination and substitution of various system components and various method procedures, where the method procedures may be performed sequentially or simultaneously in any suitable order.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended granted claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An unmanned flight system, comprising:
a body and a lift mechanism connected to the body, wherein the lift mechanism consists two rotor assembly arm structures respectively provided on two sides of the body,
wherein each of the two rotor assembly arm structures includes: an arm, a pivotable rotor assembly, a motor for driving the rotor assembly to pivot about a pivot axis, a motor base for mounting the motor, and two blades attached to the rotor assembly wherein each blade has a length at least two third of a length of the body, wherein one end of the arm is pivotally connected to one side of the body, and the motor base is pivotally provided on the other end of the arm,
wherein a rotor assembly arm structure is movable between an arm-unfolded position and an arm-folded position,
in the arm-unfolded position, the motor base is in an upright position, and a rotational axis of the motor base is higher than a center of gravity of the unmanned flight system;
and in the arm-folded position, the motor base is in an upside-down position, wherein an angle P between the rotational axis of the motor base and a rotational axis of the motor is in a range of 0 to 90°, an angle J defined by the rotational axis of the motor base and a vertical axis is greater than or equal to 90 degrees, an angle K defined by the rotational axis of the motor base and a motor axis is greater than or equal to 90 degrees,
wherein the two rotor assembly arm structures are controlled to be at a forward flight position in which the motor base pivots towards a front end of the unmanned flight system by an angle E between the motor axis and the vertical axis being greater than or equal to zero, wherein the two rotor assembly arm structures are controlled to be at a backward flight position in which the motor base pivots towards a back end of the unmanned flight system by an angle F between the motor axis and the vertical axis being greater than or equal to zero, and wherein a cooperation of the angle P, the angle J, the angle K, the angle E, and the angle F is configured to achieve a flight stability of the unmanned flight system.

2. The unmanned flight system according to claim 1, wherein a height difference between the rotational axis of the motor base and the center of gravity of the unmanned flight system is greater than one eighth of a total length of the rotor assembly in a flight state.

3. The unmanned flight system according to claim 2, wherein the height difference between the rotational axis of the motor base and the center of gravity of the unmanned flight system is less than four times the total length of the rotor assembly in the flight state.

4. The unmanned flight system according to claim 1, wherein the rotor assembly arm structure is movable between an arm-unfolded position and an arm-folded position, wherein in the arm-unfolded position, the arms of the two rotor assembly arm structures are located on the two sides of the body at a first fixed angle ($\alpha$) to a transverse axis of the body; and in the arm-folded position, the arms are located on the two sides of the body at a second fixed angle ($\gamma$) to a longitudinal axis of the body.

5. The unmanned flight system according to claim 4, wherein the first fixed angle ($\alpha$) is in a range of 0 to 55°, and the second fixed angle ($\gamma$) is in a range of 0 to 10°.

6. The unmanned flight system according to claim 4, wherein in the arm-unfolded position, a third fixed angle ($\beta$) is formed between the rotational axis of the motor base and the transverse axis of the body, wherein the third fixed angle ($\beta$) is in a range of 0 to 25°.

7. The unmanned flight system according to claim 4, wherein the rotor assembly arm structure further includes a limiting assembly for retaining the arms of the rotor assembly arm structures on the side of the body at the first fixed angle ($\alpha$) to the transverse axis of the body in the arm-unfolded position.

8. The unmanned flight system according to claim 7, wherein the limiting assembly includes an arm limiting structure, a limiting block, and a spring, wherein in the arm-unfolded position, the spring loads the limiting block such that the limiting block can be engaged with the arm limiting structure to prevent the movement of the rotor assembly arm structure.

9. The unmanned flight system according to claim 8, wherein the limiting assembly further includes a limiting unlocking component, the limiting unlocking component is connected to the limiting block, and the limiting unlocking component overcomes a force from the spring when being actuated to disengage the limiting block from the arm limiting structure.

10. The unmanned flight system according to claim 4, wherein in the arm-folded position, the rotational axis of the motor base is at or lower than the center of gravity of the unmanned flight system.

11. The unmanned flight system according to claim 1, wherein the rotor assembly includes a first blade, a second blade, and a blade mounting assembly for connecting the first blade and the second blade, wherein, the first blade and the second blade are respectively mounted at two ends of the blade mounting assembly and are pivotable between a blade-unfolded position and a blade-folded position, wherein in the blade-unfolded position, the first blade and the second blade are respectively mounted on the blade mounting assembly in such a way that they are orientated in different directions; and in the blade-folded position, the first blade and the second blade are mounted on the blade mounting assembly in such a way that they are orientated in the approximately same direction, such that the first blade at least partially overlaps with the second blade.

12. The unmanned flight system according to claim 11, wherein the blade mounting assembly includes a mounting member and a mounting seat that are fixedly connected to each other, the first blade and the second blade are respectively provided with a first blade mounting hole and a second blade mounting hole near an end of the blade mounting assembly, and the mounting member includes a first mounting post for passing through the first blade mounting hole and a second mounting post for passing through the second blade mounting hole, such that the first blades and second blades are pivotably connected to the blade mounting assembly.

13. The unmanned flight system according to claim 12, wherein the mounting seat is fixed to the mounting member through a threaded connection.

14. The unmanned flight system according to claim 12, wherein the mounting member includes a first end segment provided with the first mounting post, a second end segment provided with the second mounting post, and an intermediate segment; the mounting seat includes a first end containing segment to contain the first mounting post, a second end containing segment to contain the second mounting post, and an intermediate containing segment, and the first and second end segments are respectively at an angle (c) to the intermediate segment and are symmetrically provided on two sides of the intermediate segment, and the first and second end containing segments are at an angle to the intermediate containing segment and are symmetrically provided on two sides of the intermediate containing segment.

15. The unmanned flight system according to claim 12, wherein the ends of the first and second blades near the blade mounting assembly are configured to be at an inclined angle (d) to a blade reference plane.

16. The unmanned flight system according to claim 1, wherein the rotor assembly arm structure further includes a rotation mechanism for connecting the motor base to the arm and driving the motor base to rotate relative to the arm.

17. The unmanned flight system according to claim 16, wherein the rotation mechanism includes:
- a servo motor provided in the arm for driving the motor base to rotate relative to the arm, and
- a gearbox connected to an end of the arm, the gearbox including at least: a housing, an input gear, and an output gear, wherein the input gear is connected to the servo motor, and the output gear is fixedly connected to the motor base via a fixing part.

18. The unmanned flight system according to claim 16, wherein
- the rotor assembly arm structure includes a containing portion, and a power cable of the motor extends through the containing portion along the outside of the rotation mechanism inside the arm and is connected to a power source.

19. A control system for the unmanned flight system, wherein the control system comprises the unmanned flight system of claim 1 and a system controller.

\* \* \* \* \*